US011995750B2

United States Patent
Lee et al.

(10) Patent No.: US 11,995,750 B2
(45) Date of Patent: May 28, 2024

(54) ELECTRONIC DEVICE AND METHOD OF PROVIDING USER INTERFACE FOR EMOJI EDITING WHILE INTERWORKING WITH CAMERA FUNCTION BY USING SAID ELECTRONIC DEVICE

(71) Applicant: Samsung Electronics Co., Ltd., Suwon-si (KR)

(72) Inventors: Wooyong Lee, Suwon-si (KR); Chanhee Yoon, Suwon-si (KR); Donghwan Seo, Suwon-si (KR); Jungeun Lee, Suwon-si (KR); Chanmin Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/431,951

(22) PCT Filed: Feb. 18, 2020

(86) PCT No.: PCT/KR2020/002316
§ 371 (c)(1),
(2) Date: Aug. 18, 2021

(87) PCT Pub. No.: WO2020/171541
PCT Pub. Date: Aug. 27, 2020

(65) Prior Publication Data
US 2021/0383588 A1    Dec. 9, 2021

(30) Foreign Application Priority Data
Feb. 19, 2019    (KR) .................. 10-2019-0019528

(51) Int. Cl.
*G06T 13/40*       (2011.01)
*G06F 3/0482*     (2013.01)
(Continued)

(52) U.S. Cl.
CPC .......... *G06T 13/40* (2013.01); *G06F 3/04845* (2013.01); *G06F 3/04883* (2013.01);
(Continued)

(58) Field of Classification Search
CPC ......... G06T 13/40; G06T 13/20; G06T 13/00; G06T 2200/24; H04N 5/232935;
(Continued)

(56) References Cited

U.S. PATENT DOCUMENTS 10,242,533 B2 *   3/2019   Okada ................. G07F 17/3262
2007/0260984 A1 * 11/2007  Marks ..................... A63F 13/42
                                                                715/706
(Continued)

FOREIGN PATENT DOCUMENTS

KR    10-2006-0082738 A    7/2006
KR    10-2008-0050336 A    6/2008
(Continued)

OTHER PUBLICATIONS

Aaron Martinez, "Snapchat Update v9.28.0.0—How to Use 3D Stickers on Snapchat (Moving Emojis)", at https://www.youtube.com/watch?v=pXrTy8NOnhQ, Apr. 12, 2016. (Year: 2016).*

(Continued)

*Primary Examiner* — William L Bashore
*Assistant Examiner* — Hwei-Min Lu
(74) *Attorney, Agent, or Firm* — Jefferson IP Law, LLP

(57) ABSTRACT

An electronic device is provided. The electronic device includes a processor operably connected to a camera and configured to display a preview image containing an emoji for a user on the touch screen display based on the motion of the subject recognized by the camera, such that the motion of the subject is applied to the emoji, receive a first user input to perform a function associated with the emoji while the preview image is being displayed, display a user (Continued)

interface including the emoji on the touch screen display in response to the first user input, receive a second user input associated with a motion of the emoji included in the user interface, and apply a motion specified according to the second user input to the emoji in response to the second user input and then display the emoji on the touch screen display.

14 Claims, 16 Drawing Sheets

(51) Int. Cl.
  *G06F 3/04845* (2022.01)
  *G06F 3/04883* (2022.01)
  *H04L 65/401* (2022.01)
  *H04N 23/63* (2023.01)
(52) U.S. Cl.
  CPC ....... *H04L 65/4015* (2013.01); *H04N 23/632* (2023.01); *G06F 3/0482* (2013.01); *G06T 2200/24* (2013.01)
(58) Field of Classification Search
  CPC .......... H04N 5/232933; H04N 5/23293; G06F 3/04845; G06F 3/0484; G06F 3/04883; G06F 3/0488; G06F 3/0482; H04L 65/4015; H04L 65/401
  USPC ........................................................ 715/728
  See application file for complete search history.

(56) References Cited

U.S. PATENT DOCUMENTS

| | | | | |
|---|---|---|---|---|
| 2009/0207175 | A1* | 8/2009 | Warner | G06T 13/00 345/473 |
| 2015/0172599 | A1* | 6/2015 | Caldwell | H04N 7/157 348/14.03 |
| 2016/0117147 | A1* | 4/2016 | Zambetti | G06F 3/0483 715/727 |
| 2017/0018289 | A1 | 1/2017 | Morgenstern | |
| 2017/0212673 | A1* | 7/2017 | Bernstein | G06F 3/04817 |
| 2017/0357427 | A1* | 12/2017 | Wilson | G06F 3/04845 |
| 2017/0358117 | A1* | 12/2017 | Goossens | H04L 51/10 |
| 2018/0047200 | A1* | 2/2018 | O'Hara | G06V 10/242 |
| 2018/0081515 | A1* | 3/2018 | Block | G06F 3/04817 |
| 2018/0182149 | A1 | 6/2018 | Chong et al. | |
| 2018/0335930 | A1 | 11/2018 | Scapel et al. | |
| 2018/0350127 | A1* | 12/2018 | Davidson | G01W 1/06 |
| 2019/0005309 | A1 | 1/2019 | Hyun et al. | |
| 2019/0138266 | A1* | 5/2019 | Takechi | H04L 51/58 |
| 2020/0051341 | A1 | 2/2020 | Lee et al. | |

FOREIGN PATENT DOCUMENTS

| | | |
|---|---|---|
| KR | 10-2018-0030767 A | 3/2018 |
| KR | 10-2020-0017266 A | 2/2020 |

OTHER PUBLICATIONS

Extended European Search Report dated May 11, 2022, issued in European Application No. 20759347.6-1224.
European Office Action dated May 2, 2023, issued in European Patent Application No. Application No. 20 759 347.6.
Korean Office Action dated Jul. 17, 2023, issued in Korean Patent Application No. 10 2019 0019528.

* cited by examiner

⟨910⟩

⟨920⟩

⟨930⟩

⟨940⟩

ELECTRONIC DEVICE AND METHOD OF PROVIDING USER INTERFACE FOR EMOJI EDITING WHILE INTERWORKING WITH CAMERA FUNCTION BY USING SAID ELECTRONIC DEVICE

CROSS-REFERENCE TO RELATED APPLICATION(S)

This application is a U.S. National Stage application under 35 U.S.C. § 371 of an International application number PCT/KR2020/002316, filed on Feb. 18, 2020, which is based on and claims priority of a Korean patent application number 10-2019-0019528, filed on Feb. 19, 2019, in the Korean Intellectual Property Office, the disclosure of which is incorporated by reference herein in its entirety.

BACKGROUND

1. Field

The disclosure relates to an electronic device and a method of providing a user interface for editing an emoji while operating in conjunction with a camera function using the electronic device.

2. Description of Related Art

As online communities, such as social networking service (SNS) and messenger services, are recently activated, a user can share his or her daily life with a counterpart online. For example, an electronic device may generate an emoji that resembles a user by using a user image obtained from a camera. The emoji may include a three-dimensional avatar capable of acting for the user. The electronic device may provide the generated emoji so that the user can directly or indirectly represent his or her emotion to the counterpart by applying text or an operation to the emoji.

The above information is presented as background information only to assist with an understanding of the disclosure. No determination has been made, and no assertion is made, as to whether any of the above might be applicable as prior art with regard to the disclosure.

SUMMARY

An electronic device can generate an emoji that resembles a user and provides an edit function capable of editing the generated emoji, but has inconvenience because the edit function needs to be performed through a separate application.

Aspects of the disclosure are to address at least the above-mentioned problems and/or disadvantages and to provide at least the advantages described below. Accordingly, an aspect of the disclosure is to provide an electronic device that can provide a user interface for supporting that an edit function for an emoji can be continuously performed while operating in conjunction with a user interface displayed by executing a camera function.

Additional aspects will be set forth in part in the description which follows and, in part, will be apparent from the description, or may be learned by practice of the presented embodiments.

In accordance with an aspect of the disclosure, an electronic device is provided. The electronic device includes a camera, a touch screen display, a memory, and a processor operatively connected to the camera, the touch screen display, and the memory. The memory may store instructions, which while executed by the processor, enable the processor to display, on the touch screen display, a preview image including an emoji of a user to which a motion of a subject has been applied based on the motion of the subject obtained from the camera, to receive a first user input for performing a function related to the emoji while the preview image is being displayed, to display, on the touch screen display, a user interface including the emoji in response to the first user input, to receive a second user input related to an operation of the emoji included in the user interface, and to display, on the touch screen display, the emoji by applying, to the emoji, a designated operation corresponding to the second user input in response to the second user input.

In accordance with another aspect of the disclosure, a method of providing a user interface for editing an emoji while operating a camera function of an electronic device is provided. The method includes displaying, on a touch screen display of the electronic device, a preview image including the emoji of a user to which a motion of a subject has been applied based on the motion of the subject obtained from a camera of the electronic device, receiving a first user input for performing a function related to the emoji while the preview image is being displayed, displaying, on the touch screen display, the user interface including the emoji in response to the first user input, receiving a second user input related to an operation of the emoji included in the user interface, and displaying, on the touch screen display, the emoji by applying, to the emoji, a designated operation corresponding to the second user input in response to the second user input.

In accordance with another aspect of the disclosure, an electronic device is provided. The electronic device includes wireless communication circuitry, a touch screen display, a memory, and a processor operatively connected to the wireless communication circuitry, the touch screen display, and the memory. The memory may store instructions, which while executed by the processor, enable the processor to display, on the touch screen display, a user interface including an emoji, for performing a function related to the emoji, display, on the touch screen display, the emoji by applying, to the emoji, an animation related to a designated operation corresponding to a first user input based on the first user input related to an operation of the emoji being received, and download, from an external electronic device, at least one animation related to the operation through the wireless communication circuitry based on a second user input for downloading at least one animation of the emoji being received.

The electronic device according to various embodiments of the disclosure can perform an operation related to a function of an emoji without interruption, seamlessly and continuously by providing the user interface supporting the edit function for an emoji while operating in conjunction with the user interface according to the execution of the camera function.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
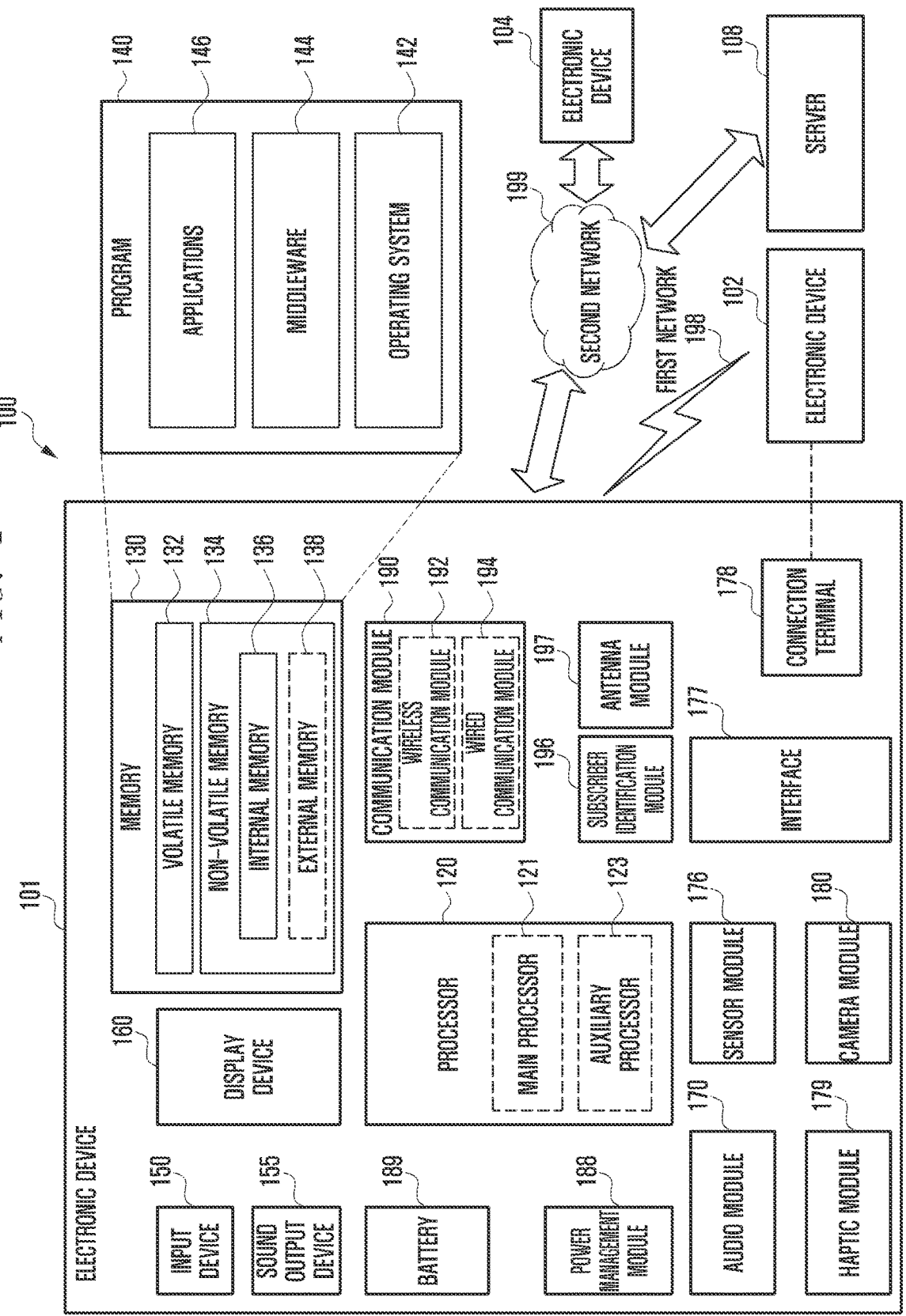
FIG. 1 is a block diagram of an electronic device in a network environment according to an embodiment of the disclosure.

FIG. 1 is a block diagram of an electronic device 101 in a network environment according to an embodiment of the disclosure.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by another component (e.g., the processor 120) of the electronic device 101, from the outside (e.g., a user) of the electronic device 101. The input device 150 may include, for example, a microphone, a mouse, a keyboard or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming call. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) (e.g., speaker or headphone) directly (e.g., wired) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wired) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) (e.g., a wireless transceiver) or a wired communication module 194 (e.g., a local area network (LAN) communication module or a power line communication (PLC) module) (e.g., a wired transceiver). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element implemented by a conductive material or a conductive pattern formed in or on a substrate (e.g., printed circuit board (PCB)). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
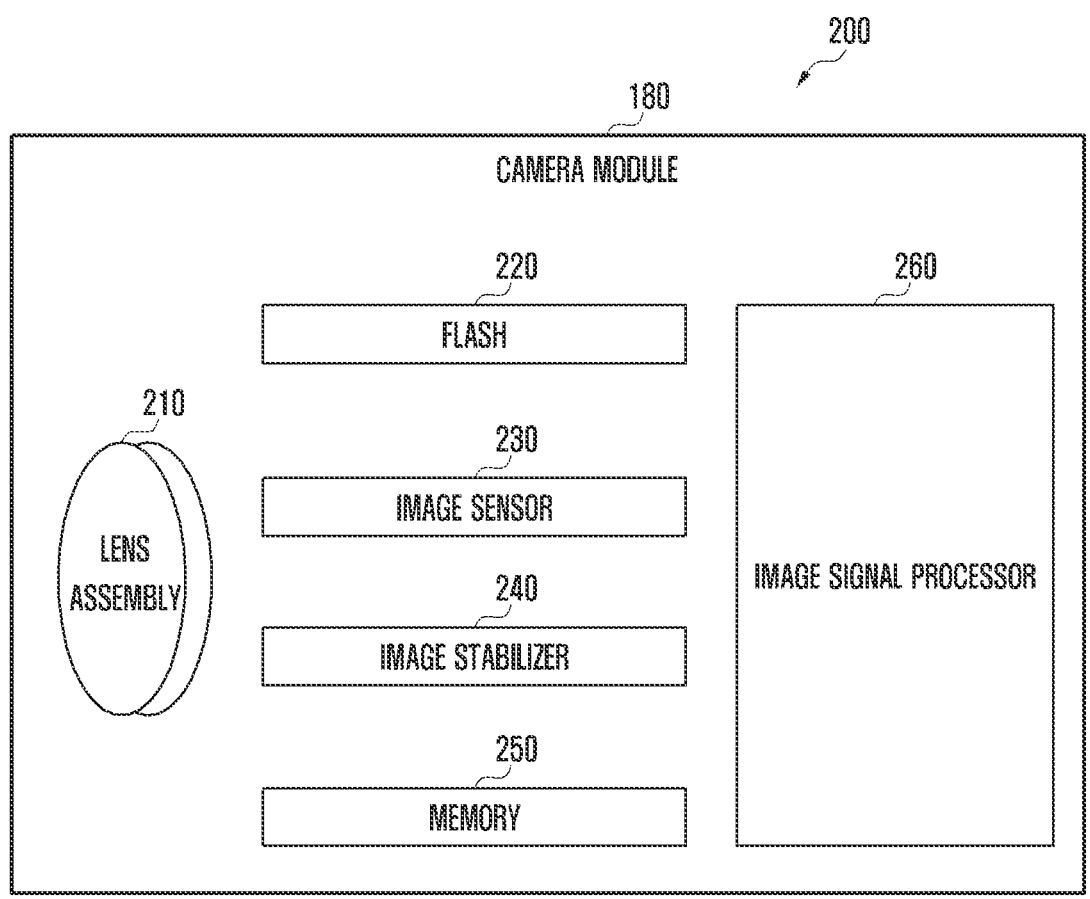
FIG. 2 is a block diagram illustrating the camera module according to an embodiment of the disclosure.

FIG. 2 is a block diagram 200 illustrating the camera module 180 according to an embodiment of the disclosure.

Referring to FIG. 2, the camera module 180 may include a lens assembly 210, a flash 220, an image sensor 230, an image stabilizer 240, memory 250 (e.g., buffer memory), or an image signal processor 260. The lens assembly 210 may collect light emitted or reflected from an object whose image is to be taken. The lens assembly 210 may include one or more lenses. According to an embodiment, the camera module 180 may include a plurality of lens assemblies 210. In such a case, the camera module 180 may form, for example, a dual camera, a 360-degree camera, or a spherical camera. Some of the plurality of lens assemblies 210 may have the same lens attribute (e.g., view angle, focal length, auto-focusing, f number, or optical zoom), or at least one lens assembly may have one or more lens attributes different from those of another lens assembly. The lens assembly 210 may include, for example, a wide-angle lens or a telephoto lens.

The flash 220 may emit light that is used to reinforce light reflected from an object. According to an embodiment, the flash 220 may include one or more light emitting diodes (LEDs) (e.g., a red-green-blue (RGB) LED, a white LED, an infrared (IR) LED, or an ultraviolet (UV) LED) or a xenon lamp. The image sensor 230 may obtain an image corresponding to an object by converting light emitted or reflected from the object and transmitted via the lens assembly 210 into an electrical signal. According to an embodiment, the image sensor 230 may include one selected from image sensors having different attributes, such as an RGB sensor, a black-and-white (BW) sensor, an IR sensor, or a UV sensor, a plurality of image sensors having the same attribute, or a plurality of image sensors having different attributes. Each image sensor included in the image sensor 230 may be implemented using, for example, a charged coupled device (CCD) sensor or a complementary metal oxide semiconductor (CMOS) sensor.

The image stabilizer 240 may move the image sensor 230 or at least one lens included in the lens assembly 210 in a particular direction, or control an operational attribute (e.g., adjust the read-out timing) of the image sensor 230 in response to the movement of the camera module 180 or the electronic device 101 including the camera module 180. This allows compensating for at least part of a negative effect (e.g., image blurring) by the movement on an image being captured. According to an embodiment, the image stabilizer 240 may sense such a movement by the camera module 180 or the electronic device 101 using a gyro sensor (not shown) or an acceleration sensor (not shown) disposed inside or outside the camera module 180. According to an embodiment, the image stabilizer 240 may be implemented, for example, as an optical image stabilizer. The memory 250 may store, at least temporarily, at least part of an image obtained via the image sensor 230 for a subsequent image processing task. For example, if image capturing is delayed due to shutter lag or multiple images are quickly captured, a raw image obtained (e.g., a Bayer-patterned image, a high-resolution image) may be stored in the memory 250, and its corresponding copy image (e.g., a low-resolution image) may be previewed via the display device 160. Thereafter, if a specified condition is met (e.g., by a user's input or system command), at least part of the raw image stored in the memory 250 may be obtained and processed, for example, by the image signal processor 260. According to an embodiment, the memory 250 may be configured as at least part of the memory 130 or as a separate memory that is operated independently from the memory 130.

The image signal processor 260 may perform one or more image processing with respect to an image obtained via the image sensor 230 or an image stored in the memory 250. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 260 may perform control (e.g., exposure time control or read-out timing control) with respect to at least one (e.g., the image sensor 230) of the components included in the camera module 180. An image processed by the image signal processor 260 may be stored back in the memory 250 for further processing, or may be provided to an external component (e.g., the memory 130, the display device 160, the electronic device 102, the electronic device 104, or the server 108) outside the camera module 180. According to an embodiment, the image signal processor 260 may be configured as at least part of the processor 120, or as a separate processor that is operated independently from the processor 120. If the image signal processor 260 is configured as a separate processor from the processor 120, at least one image processed by the image signal processor 260 may be displayed, by the processor 120, via the display module 160 as it is or after being further processed.

According to an embodiment, the electronic device 101 may include a plurality of camera modules 180 having different attributes or functions. In such a case, at least one of the plurality of camera modules 180 may form, for example, a wide-angle camera and at least another of the plurality of camera modules 180 may form a telephoto camera. Similarly, at least one of the plurality of camera modules 180 may form, for example, a front camera and at least another of the plurality of camera modules 180 may form a rear camera.

Figure 3A:
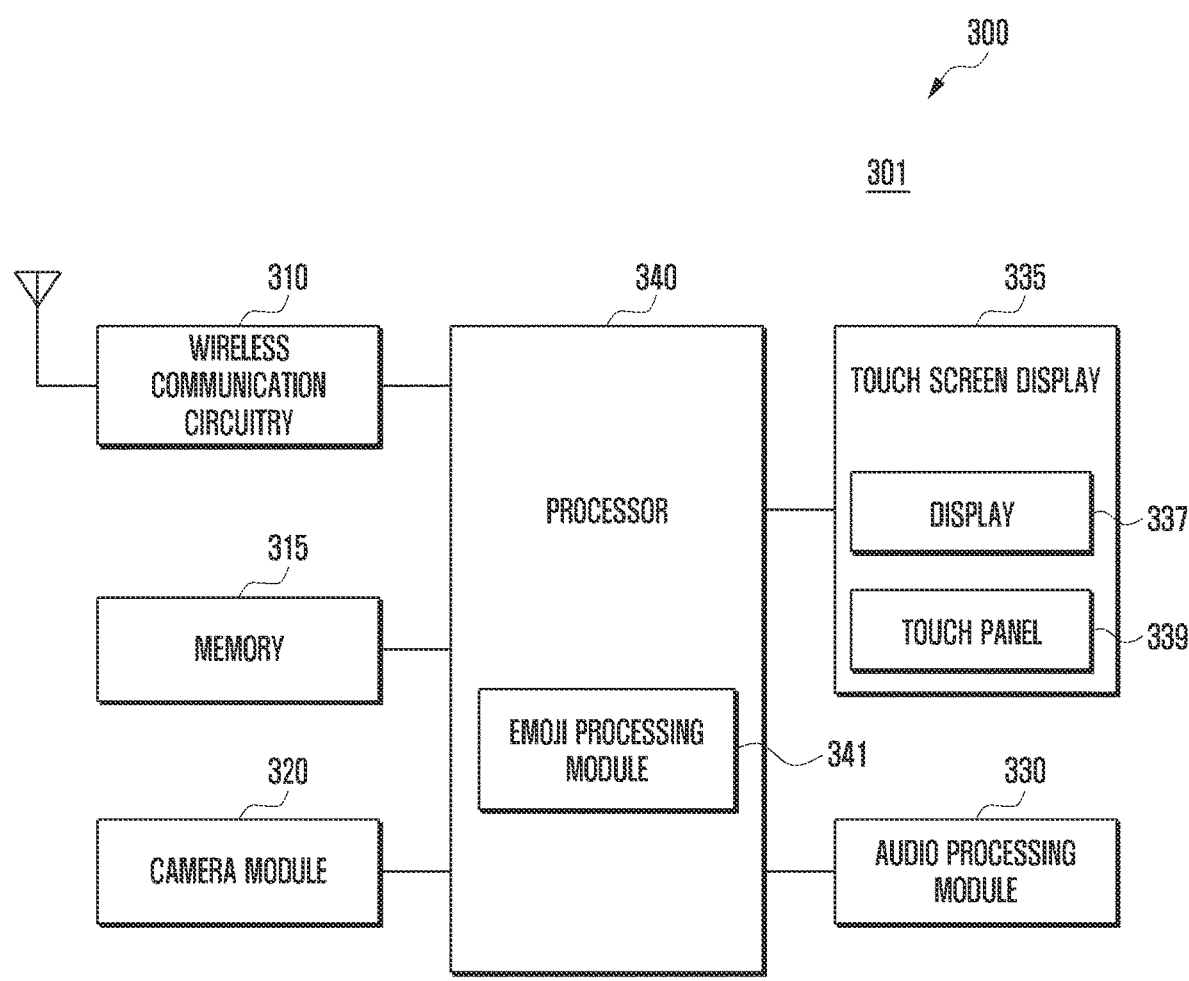
FIG. 3A is a block diagram illustrating an electronic device according to an embodiment of the disclosure.
Figure 3B:
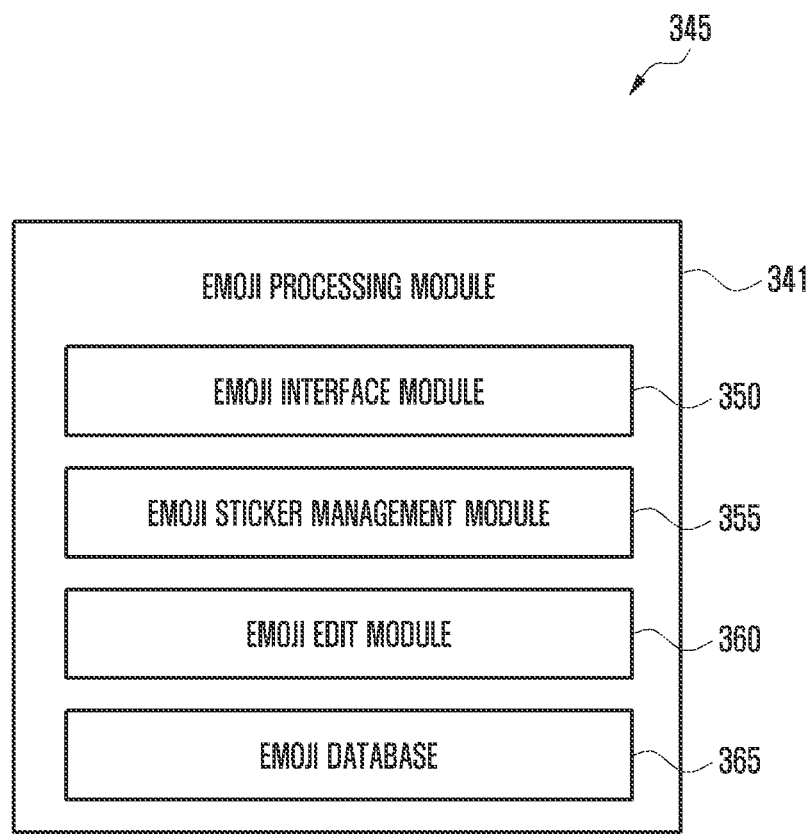
FIG. 3B is a diagram illustrating an emoji processing module according to an embodiment of the disclosure.

FIG. 3A is a block diagram 300 illustrating an electronic device 301 according to an embodiment of the disclosure. FIG. 3B is a diagram 345 illustrating an emoji processing module 341 according to an embodiment of the disclosure.

Referring to FIGS. 3A and 3B, the electronic device 301 (e.g., the electronic device 101 in FIG. 1) may include wireless communication circuitry 310 (e.g., the communication module 190 in FIG. 1), a memory 315 (e.g., the memory 130 in FIG. 1), a camera module 320 (e.g., the camera module 180 in FIG. 1), an audio processing module 330 (e.g., the audio module 170 in FIG. 1), a touch screen display 335 (e.g., the display device 160 in FIG. 1), and a processor 340 (e.g., the processor 120 in FIG. 1).

According to an embodiment, the wireless communication circuitry 310 (e.g., the communication module 190 in FIG. 1) may connect communication between the electronic device 301 (e.g., the electronic device 101 in FIG. 1) and an external electronic device (e.g., the electronic device 102 or the electronic device 104 in FIG. 1) or a server (e.g., the server 108 in FIG. 1).

In an embodiment, the wireless communication circuitry 310 may transmit a captured image of an emoji or a recorded video of an emoji to an external electronic device when a user input for sharing the emoji (e.g., a three-dimensional (3-D) avatar capable of acting for a user) is detected under the control of the processor 340.

In an embodiment, when a user input for downloading at least one item and/or at least one animation related to an emoji is detected under the control of the processor 340, the wireless communication circuitry 310 may download, from an external electronic device (e.g., the electronic device 102 or the electronic device 104 in FIG. 1) or a server (e.g., the server 108 in FIG. 1), at least one item and/or at least one animation selected by a user.

According to an embodiment, the memory 315 (e.g., the memory 130 in FIG. 1) may store a program for performing a function related to an emoji and a program according to embodiments of the disclosure.

According to an embodiment, the camera module 320 (e.g., the camera module 180 in FIG. 1) may deliver a collected image to a display 337 as a preview image so that a user can check an image reflected through the camera module 320. The camera module 320 may generate image data by capturing an image collected at timing at which an input to request photographing has been generated in response to an input to request the photographing. In an embodiment, one or more camera modules 320 may be provided.

According to an embodiment, the audio processing module 330 (e.g., the audio module 170 in FIG. 1) may include a speaker and a microphone although not illustrated. The audio processing module 330 may further include an earphone and a microphone. In an embodiment, the microphone may receive a sound (e.g., voice data), may convert the sound into an electrical signal, and may provide the electrical signal to the processor 340.

According to an embodiment, the touch screen display 335 (e.g., the display device 160 in FIG. 1) may be constructed in an integrated type including the display 337 and a touch panel 339.

According to an embodiment, when a camera function is activated under the control of the processor 340, the touch screen display 335 may display, as a preview image, an image received from the camera module 320. The touch screen display 335 may display a preview image, including an emoji to which a motion of a subject (e.g., the user of the electronic device 301) has been applied, based on a motion of the subject in response to a user input for executing an emoji camera mode under the control of the processor 340. When a user input for executing the emoji home mode is received under the control of the processor 340, the touch screen display 335 may display an emoji home screen for performing a function related to an emoji.

According to an embodiment, the processor 340 (e.g., the processor 120 in FIG. 1) may control an overall operation of the electronic device 301 and a signal flow between internal elements of the electronic device 301, may perform data processing, and may control power supply from a battery (e.g., the battery 189 in FIG. 1) to the elements.

In an embodiment, the processor 340 may include the emoji processing module 341. The emoji processing module 341 may be included as a hardware module or may be included as a software module in the processor 340 including processing circuitry. The emoji processing module 341 may include an emoji interface module 350, an emoji sticker management module 355, an emoji edit module 360 and/or an emoji database 365.

In an embodiment, the processor 340 may display, on the display 337, an image obtained from the camera module 320 as a preview image in response to the activation of the camera function. When a user input for executing the emoji camera mode is received, the processor 340 may track a motion of a subject (e.g., a user of the electronic device 301), and may display, on the display 337, a preview image including an emoji to which the motion of a subject has been applied based on the tracking.

In an embodiment, in order to perform a function related to an emoji, when a user input for executing the emoji home mode is received, the emoji interface module 350 of the emoji processing module 341 may display the emoji home screen on the display 337. For example, the function related to the emoji may include a function of animating an operation of the emoji, a function of editing the emoji, a function of setting a background image of the emoji, a function of generating a sticker based on the emoji, a function of downloading the emoji and/or an item of the emoji, a function of downloading an animation of the emoji and/or a function of sharing the emoji.

In an embodiment, when a user input related to an operation of an emoji is received in the emoji home screen, the emoji interface module 350 of the emoji processing module 341 may terminate the display of a preview image including an emoji to which a motion of a subject has been applied based on the tracking, and may display an emoji being displayed in the emoji camera mode by applying, to the emoji, an operation designated for a user input. For example, a user input related to an operation of an emoji may include at least one of a touch gesture to select a specific area (e.g., a head area, a hand area, a belly area, or a leg area) of the emoji received through the touch screen display 335, an expression (e.g., pleasure, happiness, or annoyance) received through a microphone (not illustrated) and/or user utterance or a voice input related to an operation (e.g., Hello, Yes, No, or Fighting).

In an embodiment, the emoji sticker management module 355 of the emoji processing module 341 may generate a sticker having a designated format based on an emoji displayed on the image home screen provided by the emoji home interface module 360. For example, the emoji sticker management module 355 of the emoji processing module 341 may generate at least one two-dimensional (2-D) emoji sticker based on an emoji, for example, a three-dimensional (3-D) emoji. In an embodiment, the emoji sticker management module 355 of the emoji processing module 341 may manage a sticker generated for each of at least one emoji.

In an embodiment, the emoji edit module 360 of the emoji processing module 341 may support that an emoji and/or an item of the emoji is changed in the emoji home screen provided by the emoji interface module 350. For example, the emoji edit module 360 of the emoji processing module 341 may support that an emoji and/or an item of the emoji, for example, a shape or size of each of an eye, a nose, and a mouth, a hair color, a hair style, a facial shape, a skin color, clothes and/or an accessory of the emoji is changed. The emoji edit module 360 of the emoji processing module 341 may support that a background image of an emoji can be changed. When an emoji or an item of the emoji is changed by the emoji edit module 360, the emoji processing module 341 may update at least one sticker that has been previously stored so that the at least one sticker previously stored in relation to the emoji is incorporated into a changed emoji or a changed item of the emoji. The emoji edit module 360 of the emoji processing module 341 may support that an animation of an emoji can be updated.

In an embodiment, the emoji database 365 of the emoji processing module 341 may include a 3-D emoji database (not illustrated), a 3-D accessory database (not illustrated) and/or a 2-D emoji sticker database (not illustrated), and may manage a character (e.g., a 3-D model (e.g., a face, a body, texture (e.g., an image for representing a color or texture of a 3-D model), an operation (e.g., motion information), or an accessory sticker of an emoji. The emoji database 365 of the emoji processing module 341 may store at least one animation of an emoji downloaded from an external electronic device. Data related to the emoji stored in the emoji database 365 may be provided to the emoji interface module 350 (e.g., the emoji camera mode or the emoji home mode) or a 3rd party application (not illustrated).

Figure 4:
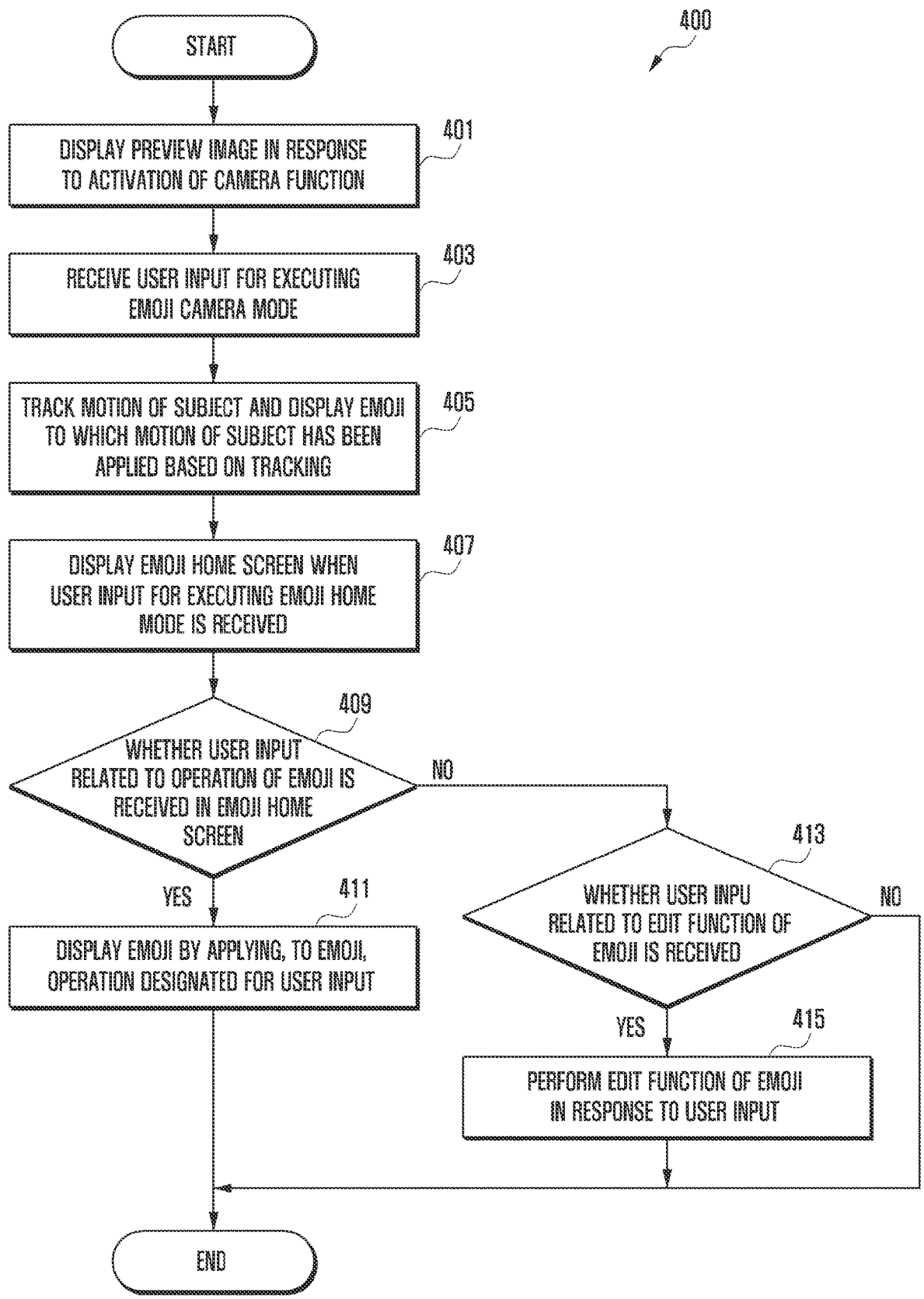
FIG. 4 is a flowchart for describing a method of performing a function related to an emoji according to an embodiment of the disclosure.

FIG. 4 is a flowchart 400 for describing a method of performing a function related to an emoji according to an embodiment of the disclosure.

Referring to FIG. 4, at operation 401, a processor (e.g., the processor 340 in FIG. 3A) may display a preview image in response to the activation of the camera function. For example, the processor may display, on a display (e.g., the display 337 in FIG. 3A), an image obtained from a camera module (e.g., the camera module 320 in FIG. 3A) as a preview image in response to the activation of the camera function.

In an embodiment, at operation 403, the processor may receive a user input for executing the emoji camera mode. For example, the processor may display a preview image, and may further display an object for executing the emoji camera mode. The processor may receive a user input to select an object for executing the emoji camera mode.

In an embodiment, when the emoji camera mode is executed, at operation 405, the processor may track a motion of a subject (e.g., a user of the electronic device (e.g., the electronic device 301 in FIG. 3A)), and may display, on the display, a preview image including an emoji to which the motion of the subject has been applied based on the tracking. For example, the processor may analyze a preview image in the state in which an emoji has been displayed in response to the execution of the emoji camera mode. The processor may recognize a change in the motion of a subject, for example, a user (e.g., a gesture that moves his or her head) or a change in the expression of the face of a user (e.g., a pupil or a mouth) based on the preview image. The processor may output an emoji by incorporating the recognized change in the motion of the user or the recognized change in the expression of the face of the user to the emoji in real time.

In an embodiment, an emoji displayed in response to the execution of the emoji camera mode may include an emoji selected by a user or an emoji that is finally generated.

In an embodiment, at operation 407, when a user input for executing the emoji home mode is received, the processor may display the emoji home screen.

In an embodiment, the emoji home mode may be a mode for performing a function related to an emoji. For example, the function related to the emoji may include a function of animating an operation of the emoji, a function of editing the emoji, a function of setting a background image of the emoji, a function of generating a sticker based on the emoji, a function of downloading the emoji and/or an item of the emoji and/or a function of downloading an animation of the emoji, but the disclosure is not limited thereto. The function related to the emoji may further include a function of displaying at least one emoji stored in an emoji database (e.g., the emoji database 365 in FIG. 3B), a function of displaying at least one downloaded item, a function of displaying at least one downloaded animation and/or the function of capturing and sharing a current emoji.

In an embodiment, when a user input to select an object for executing the emoji home mode in the emoji camera mode is received, the processor may terminate the display of a preview image, and may display, on the display, the emoji home screen including an emoji being displayed in the emoji camera mode.

In another embodiment, an object for executing the emoji home mode may be supported in a home application. In this case, a user input to select an emoji home object in the home screen not in the emoji camera mode may be detected under the control of the processor.

In the following embodiments, receiving a user input for executing the emoji home mode in the emoji camera mode is assumed and described.

In an embodiment, at operation 409, the processor may identify whether a user input related to an operation of an emoji is received in the emoji home screen. When the user input related to the operation of the emoji is received, at operation 411, the processor may display the emoji by applying, to the emoji, an operation designated for the user input.

In an embodiment, the user input related to the operation of the emoji may include at least one of a touch gesture to select a specific area (e.g., a head area, a hand area, a belly area, or a leg area) of the emoji received through a touch screen display (e.g., the touch screen display 335 in FIG.

3A) or user utterance or a voice input received through the microphone. For example, the user utterance or the voice input may be related to an expression (e.g., pleasure, happiness, or annoyance) and/or an operation (e.g., Hello, Yes, No, or Fighting). The processor may display an operation mapped to a received user input by incorporating the operation into an emoji in real time in response to the user input.

The operation of displaying the emoji by applying, to the emoji, the operation designated for the user input at operation 411 according to various embodiments will be described in detail with reference to FIGS. 8A to 9 to be described later.

In various embodiments, although not illustrated, when a user input related to an operation of an emoji is received in the emoji home screen, the processor may display, on the display, one animation among a plurality of animations stored in a memory (e.g., the memory 315 in FIG. 3A (or the emoji database 365 in FIG. 3B)) and related to the user input by applying the one animation to the emoji. For example, the plurality of animations stored in the memory (or the emoji database) and related to the user input may include an animation related to a designated operation corresponding to the user input and at least one animation downloaded from an external electronic device (e.g., the electronic device 102 or 104 or the server 108 in FIG. 1) through wireless communication circuitry (e.g., the wireless communication circuitry 310 in FIG. 3A) and related to the user input.

In an embodiment, the processor may store at least one downloaded animation in the memory (or the emoji database) separately from an emoji. For example, the at least one animation may include at least one animation related to a motion of the emoji based on joint information for the emoji. The at least one animation related to the motion of the emoji based on the joint information may be defined as a designated format (e.g., Javascript object notation (JSON)).

In an embodiment, when a user input related to an operation of an emoji is received in the emoji home screen, the processor may display, on the display, a list including a plurality of animations stored in the memory (or the emoji database) and related to the user input. When a user input to select one animation in the list is detected, the processor may display an emoji into which the selected animation has been incorporated.

In another embodiment, the processor may analyze a characteristic of a user input related to an operation of an emoji, for example, the intensity of a touch gesture and/or the amount of user utterance to select a specific area of the emoji in the emoji home screen. The processor may identify an animation to be incorporated into an emoji among a plurality of animations stored in the memory (or the emoji database) based on the analyzed intensity of the touch gesture and/or the analyzed amount of the user utterance. The processor may display the emoji into which the animation identified based on the analyzed intensity of the touch gesture and/or the analyzed amount of the user utterance has been incorporated.

In an embodiment, when a user input related to an operation of an emoji is not received, at operation 413, the processor may identify whether a user input related to an edit function of the emoji is received. When the user input related to the editing function of the emoji is received, at operation 415, the processor may perform the edit function of the emoji in response to the user input. For example, the processor may perform a function of editing the emoji in response to the user input, setting a background image of the emoji and/or generating a sticker based on the emoji and/or a function of downloading an animation of the emoji. The operation of performing the edit function of the emoji in response to the user input at operation 415 according to various embodiments will be described in detail with reference to FIGS. 10 to 12.

In various embodiments, although not illustrated, in the state in which the emoji has been displayed on the display by applying, to the emoji, the animation related to the designated operation corresponding to the user input at operation 411, when a user input for downloading at least one animation is detected, the processor may display, on the display, a user interface including the at least one animation. When a user input to select one animation in the user interface including the at least one animation is detected, the processor may download the selected animation from an external electronic device through the wireless communication circuitry, and may display, on the display, the emoji to which the designated operation has been applied by updating the emoji into an emoji to which the downloaded animation has been applied.

In an embodiment, when a user input related to the edit function of the emoji is not received, the processor may terminate the emoji home mode, and may display, on the display, a user interface of the emoji camera mode, but the disclosure is not limited thereto. The processor may maintain the state in which the image home screen is displayed.

Figure 5:
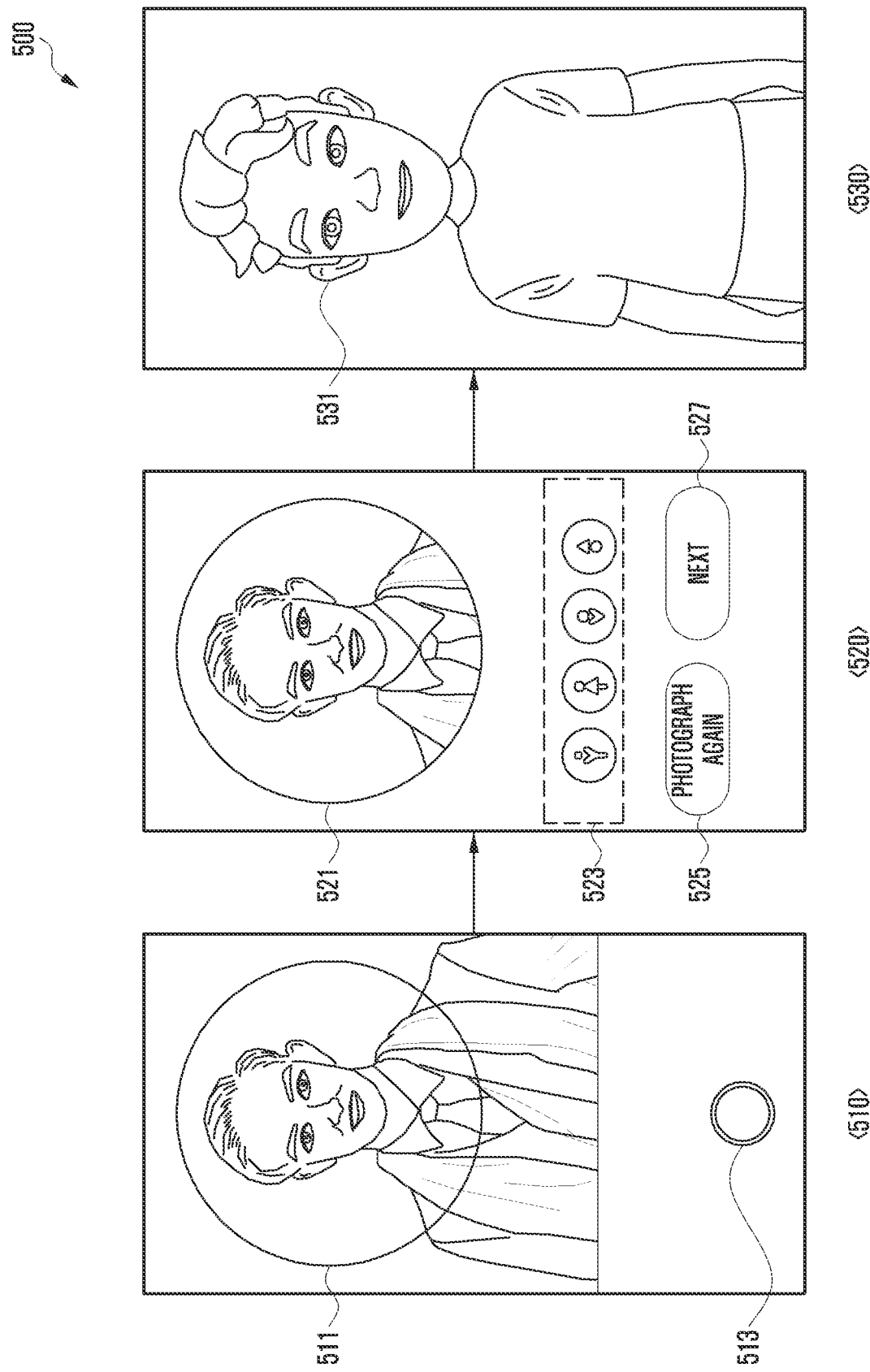
FIG. 5 is a diagram for describing a method of generating an emoji according to an embodiment of the disclosure.

FIG. 5 is a diagram 500 for describing a method of generating an emoji according to an embodiment of the disclosure.

Referring to FIG. 5, when the camera function is activated, as illustrated in reference numeral 510, a processor (e.g., the processor 340 in FIG. 3A) may display, on a display (e.g., the display 337 in FIG. 3A), an image of a subject obtained by a camera module (e.g., the camera module 320 in FIG. 3A) as a preview image 511. When a user input to select a photographing button 513 is detected, as illustrated in reference numeral 520, the processor may obtain an image 521 of the subject.

In an embodiment, although not illustrated, the processor may provide a photographing guide for obtaining an image (e.g., an image including the upper part of the body of a user) suitable for generating an emoji. For example, the photographing guide may be provided in an image or text form through the display and/or may be provided in a voice form through a speaker (e.g., the sound output device 155 in FIG. 1).

In an embodiment, after obtaining the image 521 of the subject, the processor may set emoji attribute information 523 from the obtained image 521 of the subject. For example, the emoji attribute information 523 may include gender (e.g., a male or a female), but the disclosure is not limited thereto.

In an embodiment, the processor may further display an object 525 (e.g., Photograph Again) obtaining an image of the subject again and/or an object 527 (e.g., Next) for generating an emoji of the subject.

In an embodiment, after the emoji attribute information 523 is set, when a user input to select the object 527 for generating an emoji is detected, as illustrated in reference numeral 530, the processor may generate an emoji 531 of the user having a 3-D face form based on a feature point of the user extracted from the obtained image 521 and/or the emoji attribute information 523. The processor may perform image processing so that a face image of the user recognized from the obtained image 521 and the generated emoji 531 resemble a real face of the user.

In an embodiment, although not illustrated, after setting the emoji attribute information 523, the processor may set an item of an emoji. For example, the item may include a shape or size of each of an eye, a nose, and a mouth, a hair color, a hair style, a facial shape, a skin color, clothes and/or an accessory (e.g., glasses, a hat, shoes, or earrings) of the emoji. Since the item set in response to a user input is incorporated and displayed in real time, the user can intuitively check the set item.

Figure 6:
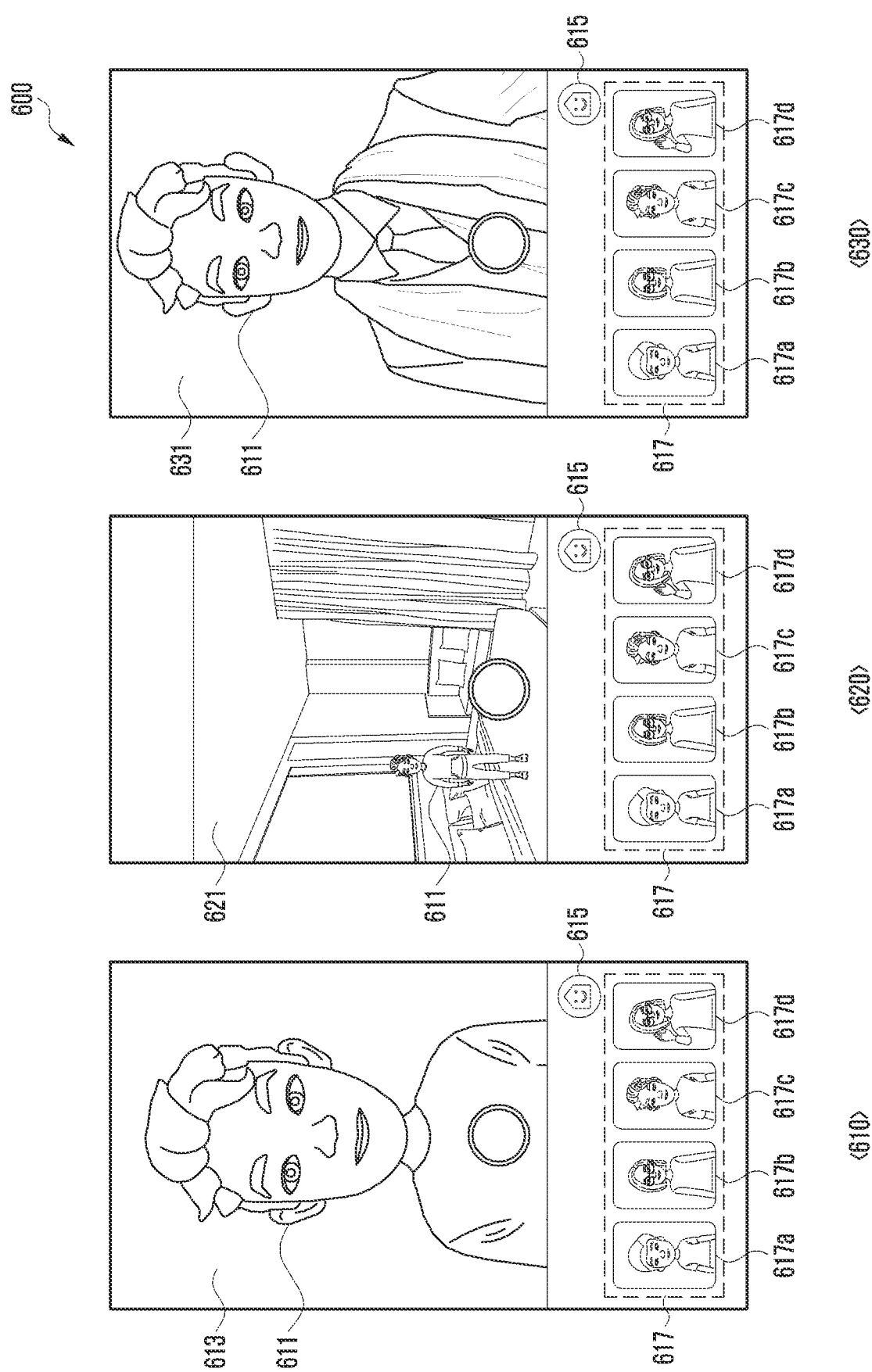
FIG. 6 is a diagram for describing a method of displaying an emoji in an emoji camera mode according to an embodiment of the disclosure.

FIG. 6 is a diagram 600 for describing a method of displaying an emoji in the emoji camera mode according to an embodiment of the disclosure.

In an embodiment, a processor (e.g., the processor 340 in FIG. 3A) may display, on a display (e.g., the display 337 in FIG. 3A), an image of a subject obtained by a camera module (e.g., the camera module 320 in FIG. 3A), for example, a user of an electronic device (e.g., the electronic device 301 in FIG. 3A) as a preview image in response to the activation of the camera function.

Referring to FIG. 6, when a user input for executing the emoji camera mode is received, as illustrated in reference numeral 610, 620, or 630, the processor may display an emoji 611 (e.g., the emoji 531 in FIG. 5). For example, when the emoji camera mode is executed, the processor may dispose and display the emoji 611 on a designated background image 613 as illustrated in reference numeral 610, may dispose the emoji 611 in a real world 621 as illustrated in reference numeral 620, or may recognize the face of a user in a preview image 631 and display the emoji 611 by synthesizing the recognized face and the emoji 611 as illustrated in reference numeral 630.

In an embodiment, the emoji 611 may be an emoji selected by a user or may include a finally generated emoji.

In an embodiment, the processor may continuously obtain a preview image of a user while maintaining the camera function in the state in which the emoji 611 is outputted. For example, the processor may analyze a preview image in the state in which the emoji 611 is displayed. For example, the processor may recognize a change in the motion of a user (e.g., a gesture that moves his or her head) or a change in the facial expression of a user (e.g., a pupil or a mouth) based on a preview image, and may output the emoji 611 by incorporating, into the emoji 611, the recognized change in the motion or the recognized change in the facial expression in real time.

In an embodiment, when the emoji camera mode is executed, the processor may display, in some region of the display, a list 617 (e.g., a first emoji 617a, a second emoji 617b, a third emoji 617c, and a fourth emoji 617d) including at least one emoji previously stored in an emoji database (e.g., the emoji database 365 in FIG. 3B). When one emoji is selected in the list 617 including the at least one emoji, the processor may display the selected emoji by changing, into the selected emoji, the emoji 611 now being displayed.

In an embodiment, the processor may execute the emoji home mode for performing a function related to an emoji. For example, when the emoji camera mode is executed, the processor may display the emoji 611 on the display, and may further display an object 615 for executing the emoji home mode. When a user input to select the object 615 for executing the emoji home mode is received, the processor may display the emoji home screen including the emoji 611.

The emoji home screen displayed as the emoji home mode for performing a function related to an emoji according to various embodiments is executed will be described in detail with reference to FIG. 7 to be described below.

Figure 7:
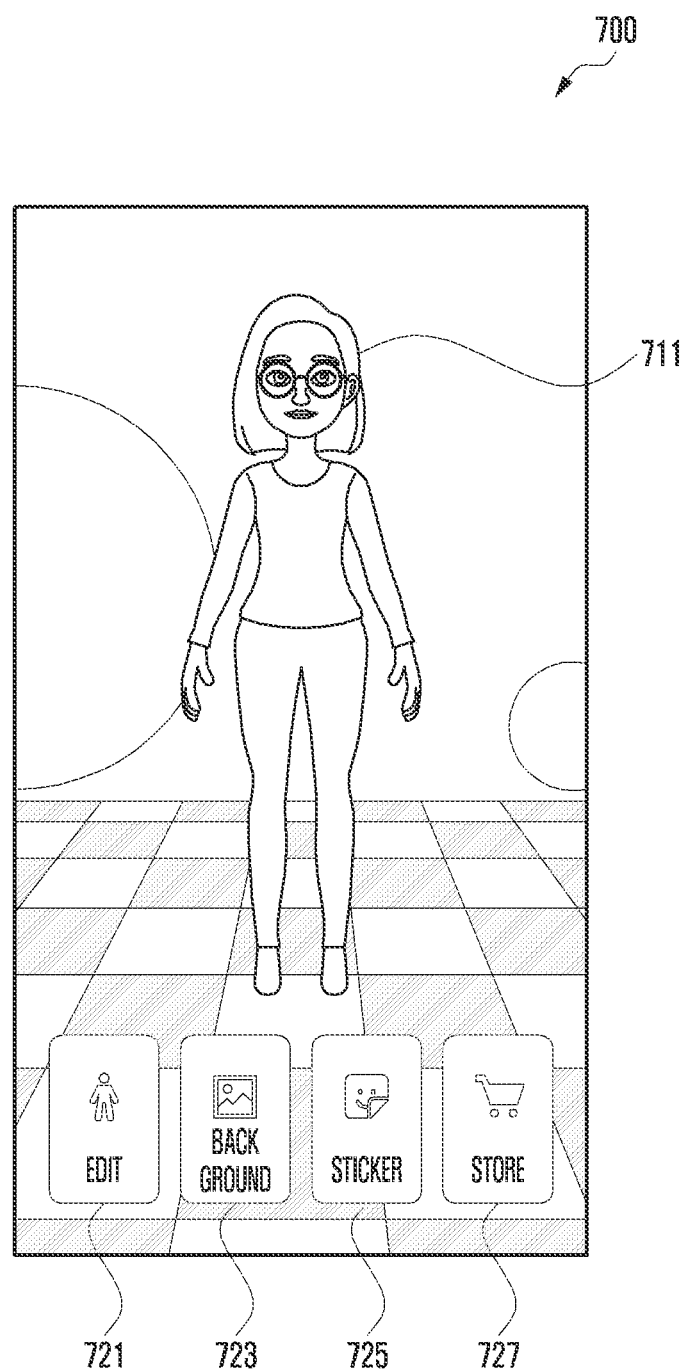
FIG. 7 is a diagram for describing an emoji home screen for performing a function related to an emoji according to an embodiment of the disclosure.

FIG. 7 is a diagram 700 for describing the emoji home screen for performing a function related to an emoji according to an embodiment of the disclosure.

In FIG. 7 according to an embodiment, a case where as one emoji, for example, the second emoji 617b is selected in a list including at least one emoji (e.g., the emoji list 617 including the first emoji 617a, the second emoji 617b, the third emoji 617c, and the fourth emoji 617d in FIG. 6), displayed in some region of the display (e.g., the display 337 in FIG. 3A), an emoji (e.g., the emoji 611 in FIG. 6) is changed into the selected second emoji 617b and displayed on the emoji home screen as illustrated in FIG. 6 is assumed and described.

Referring to FIG. 7, a processor (e.g., the processor 340 in FIG. 3A) may display, on a display (e.g., the display 337 in FIG. 3A), a user interface for performing a function related to an emoji 711 (e.g., the emoji 611 in FIG. 6), for example, the emoji home screen (or an emoji showroom). For example, the function related to the emoji 711 may include a function of animating an operation of the emoji, a function of editing the emoji, a function of setting a background image of the emoji, a function of generating a sticker based on the emoji, a function of downloading the emoji and/or an item of the emoji and/or a function of downloading an animation of the emoji. The emoji home screen for performing the function related to the emoji 711 may include the emoji 711, an edit object 721 for editing the emoji 711, a background setting object 723 for setting a background image of the emoji 711, a sticker generation object 725 for generating the emoji 711 as a sticker and/or a store object 727 for downloading an item of the emoji 711 and/or an animation of the emoji 711, but the disclosure is not limited thereto. For example, the emoji home screen for performing a function related to the emoji 711 may further include an emoji display object for displaying at least one emoji generated and previously stored in an emoji database (e.g., the emoji database 365 in FIG. 3B), an item setting object for setting an item for the emoji 711, or a sharing object for capturing and sharing the emoji 711 displayed on the emoji home screen.

In an embodiment, when the emoji home screen for performing a function related to the emoji 711 is displayed on the display, the processor may display the emoji 711 to which an animation related to an operation has been randomly applied. For example, the processor may display the emoji 711 to which an animation related to an operation (e.g., Hello) of saying hi at designated time intervals or an animation related to a smiling operation has been applied, but the disclosure is not limited thereto.

In an embodiment, after the emoji home screen including the emoji 711 is displayed, if a user input is not detected for a designated time, an animation related to an operation designated for the emoji 711 may be applied and displayed. For example, if a user input is not detected for a designated time, the emoji 711 to which an animation related to a knocking operation, such as knocking on a door, has been applied may be displayed under the control of the processor in order to induce a user input.

In an embodiment, when the emoji home screen for performing a function related to the emoji 711 is displayed on the display, if information related to the emoji 711 has been set for the emoji 711, the processor may display the set information along with the emoji 711. For example, the information related to the emoji 711 may include identification information of the emoji 711, for example, a name or a nickname. The information related to the emoji 711 may be displayed on the display for a designated time under the control of the processor.

In an embodiment, when the emoji home screen for performing a function related to the emoji 711 is displayed on the display, an operation of the emoji 711 may be previewed in response to a received user input instead of performing an operation of tracking a motion of a user. For example, the user input may include a touch gesture to select a specific area (e.g., a head area, a hand area, a belly area, or a leg area) of the emoji 711, an expression (e.g., pleasure, happiness, or annoyance) and/or user utterance related to an operation (e.g., Hello, Yes, No, or Fighting).

In an embodiment, when a user input to select the edit object 721 for editing the emoji 711 included in the emoji home screen is detected, the processor may display, on the display, a user interface (e.g., a user interface in which a shape or size of each of an eye, a nose, and a mouth, a hair color, a hair style, a facial shape, a skin color, clothes and/or an accessory of the emoji 711 may be changed) for changing an item of the emoji 711. For example, the processor may load a 3-D model (e.g., a face or a body), texture (e.g., an image for representing a color or texture of a 3-D model), or an operation from an emoji database (e.g., the emoji database 365 in FIG. 3B), and may display a user interface for changing an item of the emoji 711 based on the 3-D model, texture or operation.

In an embodiment, when an item to be changed by a user is selected in a user interface, the processor may display the emoji 711 by incorporating the selected item into the emoji 711 in real time. For example, if an item of the emoji 711, for example, at least one accessory is to be edited, the processor may load the binary file of each of the at least one accessory, and may display the emoji 711 by applying the binary file to the emoji 711 in a stream buffer form in real time. If an item of the emoji 711, for example, at least one accessory is to be edited and stored, the processor may store the emoji 711 in the emoji database by integrating the emoji 711 to which the at least one accessory finally edited has been applied.

In an embodiment, when an item of the emoji 711, for example, a facial shape (or a facial expression) is selected, the processor may generate a real-time thumbnail (live thumbnail generator) to which the selected facial shape (or facial expression) has been applied. As a real-time thumbnail is generated, a user can previously check an item to be changed through the generated thumbnail although the user does not select the item to be changed, for example, a facial shape (or a facial expression).

In an embodiment, when a user input to select the background setting object 723 for setting a background image of the emoji 711 included in the emoji home screen is detected, the processor may support that a background, for example, an empty area other than an emoji can be changed.

In an embodiment, when a user input to select the sticker generation object 725 for generating, as a sticker, the emoji 711 included in the emoji home screen is detected, the generation of a sticker based on the emoji 711 may be supported.

In an embodiment, when a user input to select the store object 727 included in the emoji home screen is detected, the processor may support that an item of the emoji 711 and/or an animation of the emoji 711 can be downloaded.

In an embodiment, when a user input to select the store object 727 capable of downloading an item of the emoji 711 and/or an animation of the emoji 711 included in the emoji home screen is detected, the processor may display a user interface including at least one item related to the emoji 711 and/or at least one animation of the emoji 711. For example, the at least one item related to the emoji 711 may include a hair style, clothes, an accessory (e.g., glasses, a hat, shoes, or earrings), an emoji indicative of a specific character and/or an accessory related to a specific character. The at least one animation of the emoji may include the at least one animation related to a specific area or at least one animation related to an expression and/or an operation.

In an embodiment, when a user input to select at least one item and/or at least one animation in a user interface is detected, the processor may download at least one selected item and/or at least one selected animation from an external electronic device (e.g., the electronic device 102 or 104 or the server 108 in FIG. 1) through wireless communication circuitry (e.g., the wireless communication circuitry 310 in FIG. 3A). The downloaded at least one item and/or at least one animation may be stored in the emoji database.

In an embodiment, the downloaded at least one animation may be updated by being applied to the emoji 711 displayed on the emoji home screen. For example, a case where an animation, for example, an animation related to an operation of calling a name to be displayed if a user input is not detected for a designated time is downloaded is assumed and described. After the emoji home screen including the emoji 711 is displayed, if a user input is not detected for a designated time, the processor may display the emoji 711 to which a downloaded animation, for example, an animation related to an operation of calling a name has been applied by updating the emoji 711 to which an animation related to an operation designated for the emoji 711, for example, an animation related to a knocking operation has been applied with the emoji 711 to which the downloaded animation has been applied.

The disclosure is not limited to the case. In another embodiment, after the emoji home screen including the emoji 711 is displayed, if a user input is not detected for a designated time, the processor may change and display the emoji 711 to which an animation related to an operation of knocking at designated time intervals (e.g., an animation related to an operation designated for the emoji 711) has been applied and the emoji 711 to which an animation related to an operation of calling a name (e.g., a downloaded animation) has been applied.

Figure 8A:
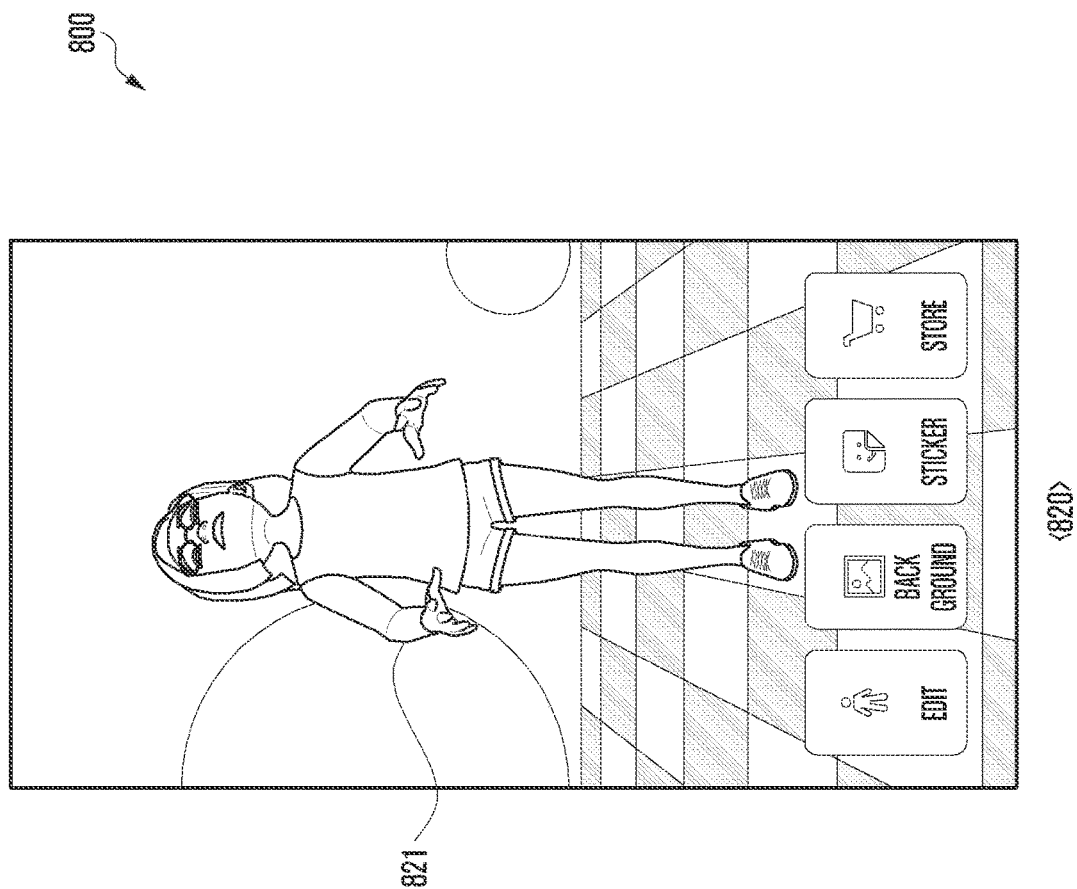
FIGS. 8A, 8B, and 8C are diagrams for describing a method of displaying an emoji by incorporating an operation of the emoji in response to a user input related to the operation of the emoji according to various embodiments of the disclosure.
Figure 8A:
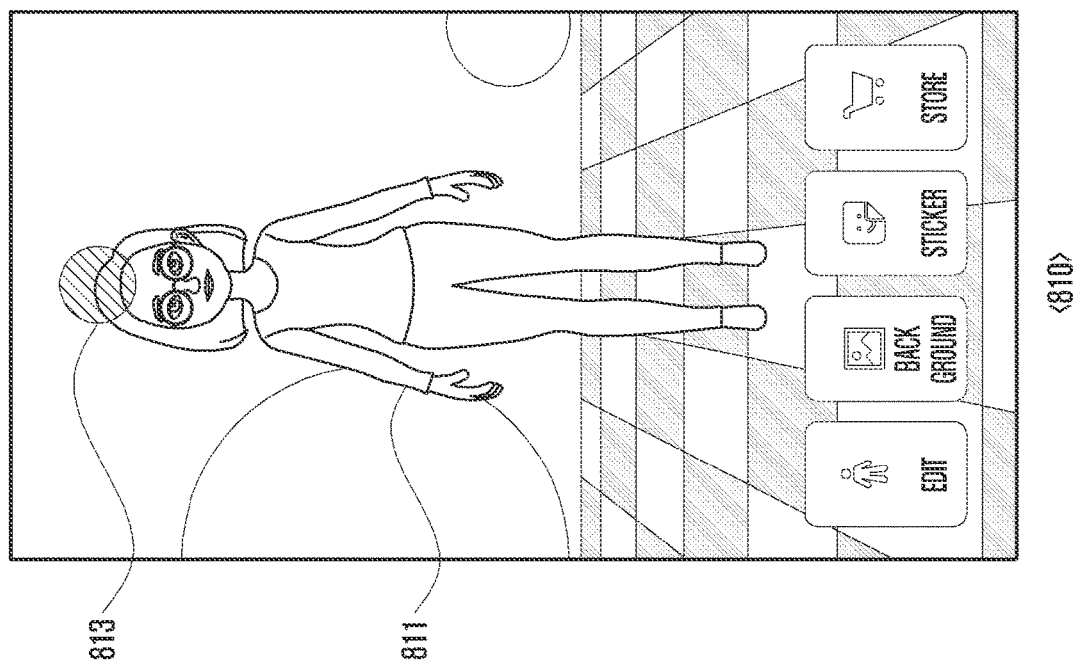
Figure 8B:
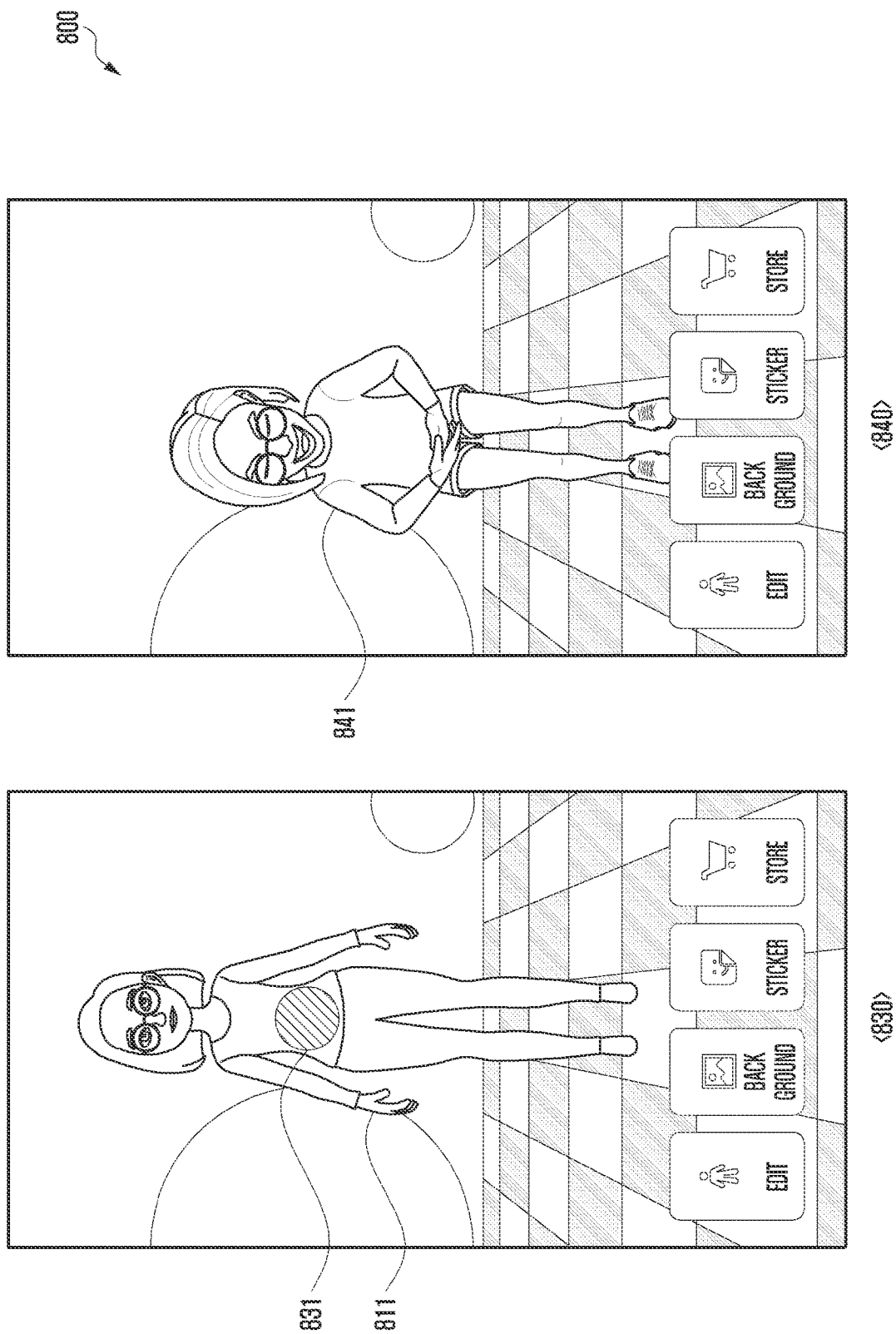
Figure 8C:
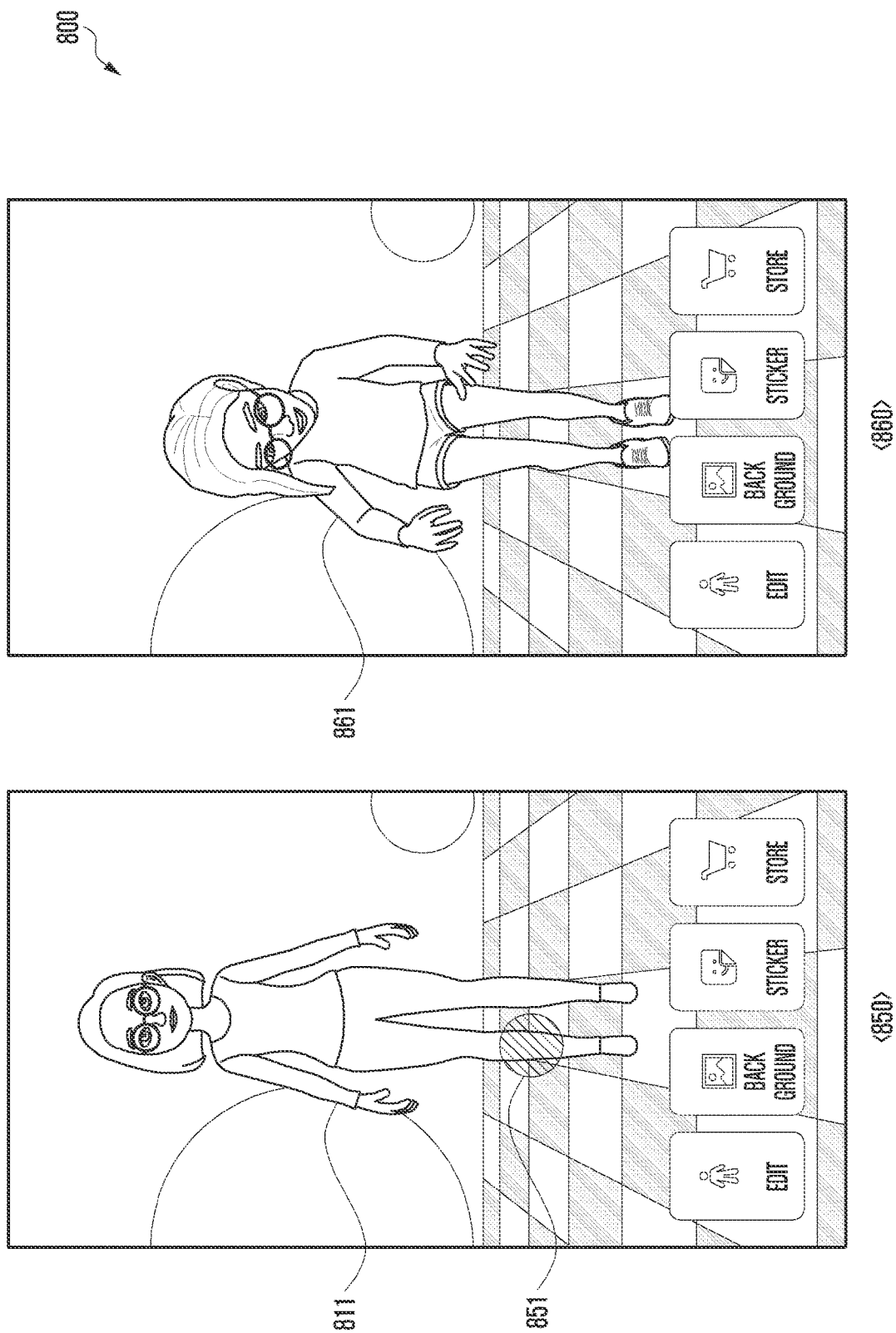

FIGS. 8A to 8C are diagrams 800 for describing a method of displaying an emoji by incorporating an operation of the emoji in response to a user input related to the operation of the emoji according to various embodiments of the disclosure.

Referring to FIG. 8A, as illustrated in reference numeral 810, a processor (e.g., the processor 340 in FIG. 3A) may detect a specific area of the emoji 811 (e.g., the emoji 711 in FIG. 7), for example, a touch gesture 813 in a head area in the emoji home screen. For example, the touch gesture 813 in the head area may include an input to touch the head area or a gesture to turn the head. In response to the touch gesture 813 in the head area, the processor may display an emoji 821 into which an operation designated for the touch gesture 813 in the head area, for example, an animation related to a motion of the head has been incorporated (e.g., an emoji to which an animation in which a head is turned has been incorporated), as illustrated in reference numeral 820.

Referring to FIG. 8B, as illustrated in reference numeral 830, the processor may detect a touch gesture 831 in a specific area of the emoji 811, for example, a belly area. In response to the touch gesture 831 in the belly area, the processor may display an emoji 841 into which an operation designated for the touch gesture 831 in the belly area, for example, an animation that smiles while holding the belly with its hands has been incorporated, as illustrated in reference numeral 840.

Referring to FIG. 8C, as illustrated in reference numeral 850, the processor may detect a touch gesture 851 in a specific area of the emoji 811, for example, in a knee area. In response to the touch gesture 851 in the knee area, the processor may display an emoji 861 into which an operation designated for the touch gesture 851 in the knee area, for example, an animation that falls with its legs bent has been incorporated, as illustrated in reference numeral 860.

In an embodiment, the processor may download, from an external electronic device (e.g., the electronic device 102 or 104 or the server 108 in FIG. 1), at least one animation related to a specific area through wireless communication circuitry (e.g., the wireless communication circuitry 310 in FIG. 3A), and may store the downloaded at least one animation in the emoji database. For example, when at least one animation related to a head area, for example, an animation related to dancing in which a head is shaken is downloaded, the processor may display the emoji 821 into which the downloaded animation, for example, the animation related to dancing in which a head is shaken has been incorporated by updating the emoji 821 into which an animation related to an operation designated for the touch gesture 813 in the head area, for example, an animation related to dancing in which a head is shaken has been incorporated with the emoji 821 into which the downloaded animation has been incorporated.

In another embodiment, the processor may display the emoji 821 to which a different animation has been applied based on the number of times that the touch gesture 813 in the head area is detected. For example, when the touch gesture 813 is detected in the head area, the processor may display the emoji 821 into which a first animation related to the head area, for example, an animation in which a head is turned (e.g., an animation related to an operation designated for the touch gesture 813) has been incorporated. When the touch gesture 813 is detected in the head area again, the processor may display the emoji 821 into which a second animation related to the head area, for example, an animation related to dancing in which the head is shaken (e.g., a downloaded animation) has been incorporated.

In another embodiment, the processor may display, on the display, a list including at least one animation related to a head area. For example, the processor may display a list including an animation in which a head is turned and an animation related to dancing in which a head is shaken. When a user input to select one animation in the list is detected, the processor may display the emoji 821 into which the selected animation has been incorporated.

In another embodiment, the processor may analyze a characteristic of a user input related to an operation of an emoji, for example, the intensity of the touch gesture 813 to select a specific area of the emoji, and may identify an animation to be incorporated into the emoji 821 among at least one animation stored in the emoji database based on the characteristic. For example, when the intensity of the touch gesture 813 is greater than a designated intensity value, the processor may display the emoji 821 into which an animation having a great operation, for example, an animation related to dancing in which a head is shaken, among an animation in which a head is turned and the animation related to dancing in which a head is shaken, which are stored in the emoji database, has been incorporated. When the intensity of the touch gesture 813 is not greater than (e.g., equal to or smaller than) a designated intensity value, the processor may display the emoji 821 into which an animation having a small operation, for example, an animation in which a head is turned among the animation in which a head is turned and an animation related to dancing in which a head is shaken, which are stored in the emoji database, has been incorporated.

In various embodiments, as in the head area of FIG. 8A, in the belly area of FIG. 8B and the knee area of FIG. 8C, the processor may display an emoji into which at least one animation (e.g., an animation that says hello while putting its hands on the belly or an animation related to dancing in which its legs are shaken) downloaded from an external electronic device and related to the belly area or leg area has been incorporated by updating the emoji 841 or 861 into which an animation related to an operation designated for the touch gesture 831 or 851 has been incorporated with the emoji into which the at least one animation has been incorporated.

A user input has been described as a touch gesture in a specific area of an emoji with reference to FIGS. 8A to 8C according to various embodiments, but the disclosure is not limited thereto. For example, a user input may include user utterance.

An embodiment in which an emoji is displayed by incorporating an operation of the emoji in response to a user input according to various embodiments, for example, user utterance is described with reference to FIG. 9 below.

Figure 9:
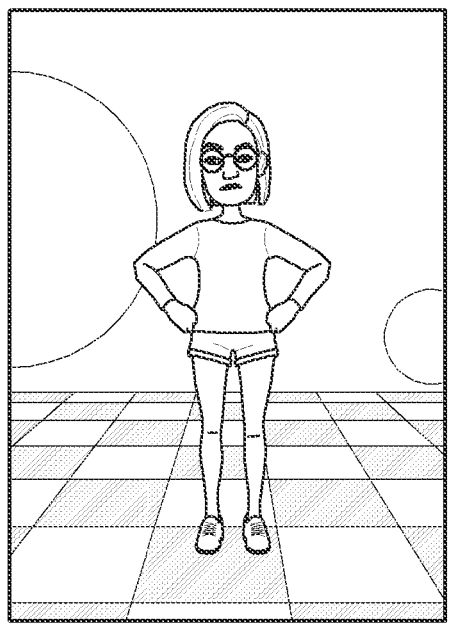
FIG. 9 is a diagram for describing a method of displaying an emoji by incorporating an operation of the emoji in response to a user input related to an operation of the emoji according to an embodiment of the disclosure.
Figure 9:
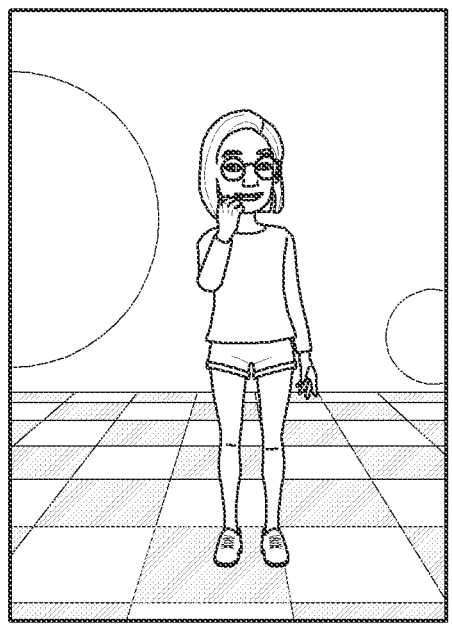
Figure 9:
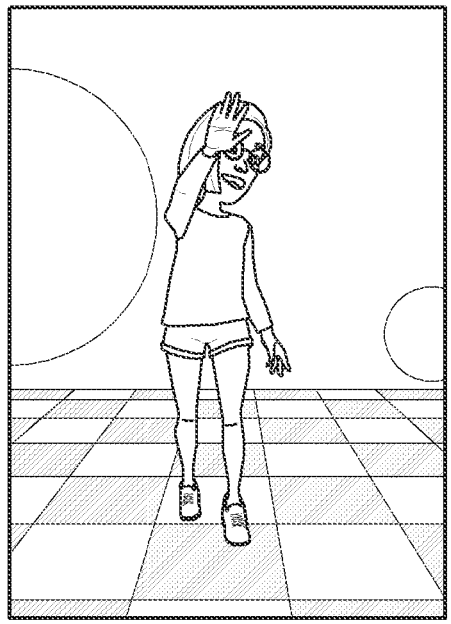
Figure 9:
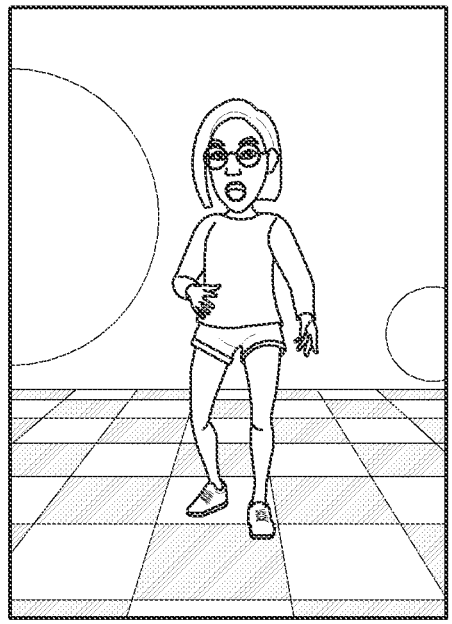

FIG. 9 is a diagram 900 for describing a method of displaying an emoji by incorporating an operation of the emoji in response to a user input related to an operation of the emoji according to an embodiment of the disclosure.

Referring to FIG. 9, a processor (e.g., the processor 340 in FIG. 3A) may receive user utterance related to an expression and/or an operation through the microphone (not illustrated) in the state in which the emoji home screen has been displayed.

In an embodiment, when an expression, for example, user utterance related to "Angriness" is received, the processor may display an emoji into which an operation designated for the user utterance related to "Angriness" has been incorporated, as illustrated in reference numeral 910.

In an embodiment, the processor may download, from an external electronic device (e.g., the electronic device 102 or 104 or the server 108 in FIG. 1), at least one animation related to user utterance through wireless communication circuitry (e.g., the wireless communication circuitry 310 in FIG. 3A). For example, when an animation related to "Angriness", for example, an animation related to a shouting operation is downloaded, the processor may display the emoji into which the downloaded shouting operation has been incorporated by updating an emoji into which an operation designated for user utterance related to "Angriness" in reference numeral 910 has been incorporated (e.g., an emoji into which an operation to put its hands on the hips has been incorporated) with the emoji into which the downloaded shouting operation has been incorporated.

In another embodiment, when user utterance related to "Angriness" is received, the processor may change and display a plurality of animations stored in the emoji database and related to "Angriness", for example, an emoji into which an operation to put its hands on the hips has been incorporated and an emoji into which a shouting operation has been incorporated at designated time intervals.

In another embodiment, the processor may analyze a characteristic of a user input related to an operation of an emoji, for example, the amount of user utterance, and may identify an animation to be incorporated into the emoji among at least one animation stored in the emoji database based on the characteristic. For example, when the amount of user utterance is greater than a designated intensity value, the processor may display an emoji into which an animation having a great operation, for example, an animation related to a shouting operation, among a plurality of animations stored in the emoji database and related to "Angriness", for example, an animation related to an operation of putting its hands on the hips and the animation related to the shouting operation has been incorporated. When the amount of user utterance is not greater than (e.g., equal to or smaller than) a designated intensity value, the processor may display an emoji into which an animation having a small operation, for example, an animation related to an operation of putting its hands on the hips, among a plurality of animations stored in the emoji database and related to "Angriness", for example, the animation related to the operation of putting its hands on the hips and an animation related to a shouting operation has been incorporated.

In an embodiment, when user utterance related to an operation, for example, "Fighting" is received, the processor may display an emoji into which an operation designated for the user utterance related to "Fighting" has been incorporated, as illustrated in reference numeral 920. In an embodiment, when user utterance related to an operation, for example, "High five" is received, the processor may display an emoji into which an operation designated for the user utterance related to "High five" has been incorporated, as illustrated in reference numeral 930. In an embodiment, when user utterance related to an expression, for example, "Surprise" is received, the processor may display an emoji into which an operation designated for the user utterance related to "Surprise" has been incorporated, as illustrated in reference numeral 940.

In various embodiments, as in reference numeral 910, in reference numerals 920, 930, and 940, the processor may display emojis into which animations downloaded from an external electronic device and related to operations designated for user utterance related to "Fighting", "High five", and "Surprise" have been incorporated, respectively, by updating emojis into which animations related to operations designated for the user utterance related to "Fighting", "High five", and "Surprise" have been incorporated, respectively, with the emojis into which the downloaded animations have been incorporated, respectively.

Figure 10:
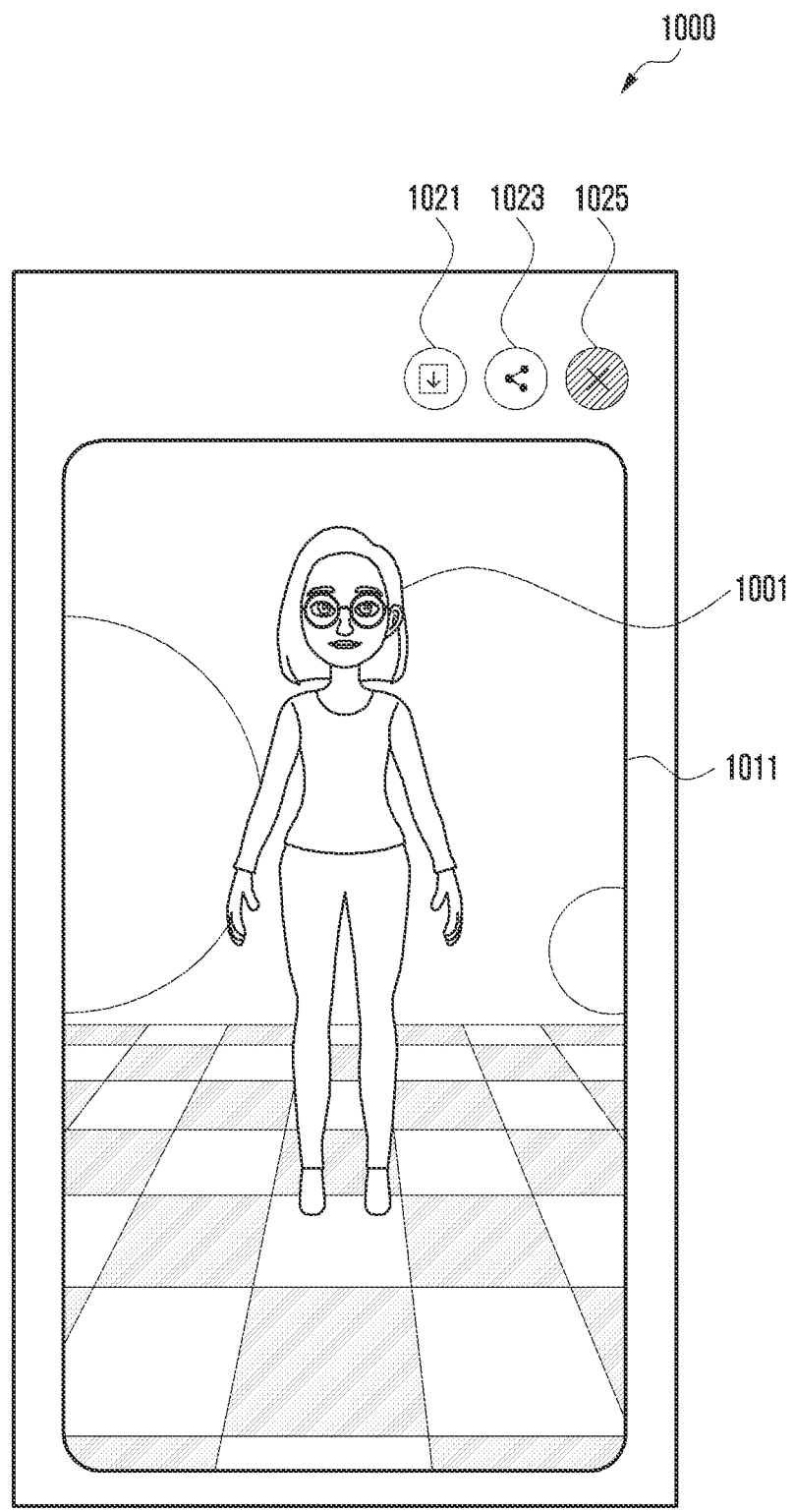
FIG. 10 is a diagram for describing a method of sharing an emoji according to an embodiment of the disclosure.

FIG. 10 is a diagram 1000 for describing a method of sharing an emoji according to an embodiment of the disclosure.

Referring to FIG. 10, when a user input for sharing an emoji 1001 (e.g., the emoji 811 in FIGS. 8A to 8C) (e.g., a sharing object (not illustrated) is selected) is detected in the state in which the emoji home screen in FIG. 7 has been displayed, the processor may capture an operation of the emoji 1001 displayed at timing at which the user input is detected, and may display, on a display (e.g., the display 337 in FIG. 3A), an image 1011 including the captured emoji 1001. The image 1011 including the captured emoji 1001 may be stored in a memory (e.g., the memory 315 in FIG. 3A) or shared with an external electronic device (e.g., the electronic device 102 or 104 or the server 108 in FIG. 1). For example, when a user input to select an object 1021 that is separately provided is detected, the processor may store, in the memory, the image 1011 including the captured emoji 1001. When a user input to select a sharing object 1023 that is separately provided is detected, the processor may transmit, to the external electronic device, the image 1011 including the captured emoji 1001. After storing the image 1011 including the captured emoji 1001 in the memory or transmitting the image 1011 including the captured emoji 1001 to the external electronic device, the processor may display the image home screen. When a user input to select a cancel object 1025 that is separately provided is detected, the processor may terminate the display of the image 1011 including the captured emoji 1001 (e.g., without performing an operation of sharing the image 1011 including the emoji 1001), and may display the image home screen.

According to various embodiments, a case where an operation of the emoji 1001 displayed at timing at which a user input is detected is captured and the emoji 1001 is shared has been described with reference to FIG. 10, but the disclosure is not limited thereto. For example, when a user input for sharing the emoji 1001 is detected, the processor may record an operation of the emoji 1001 displayed at timing at which the user input is detected, and may store the recorded image in the memory or may share the recorded image with an external electronic device.

Figure 11:
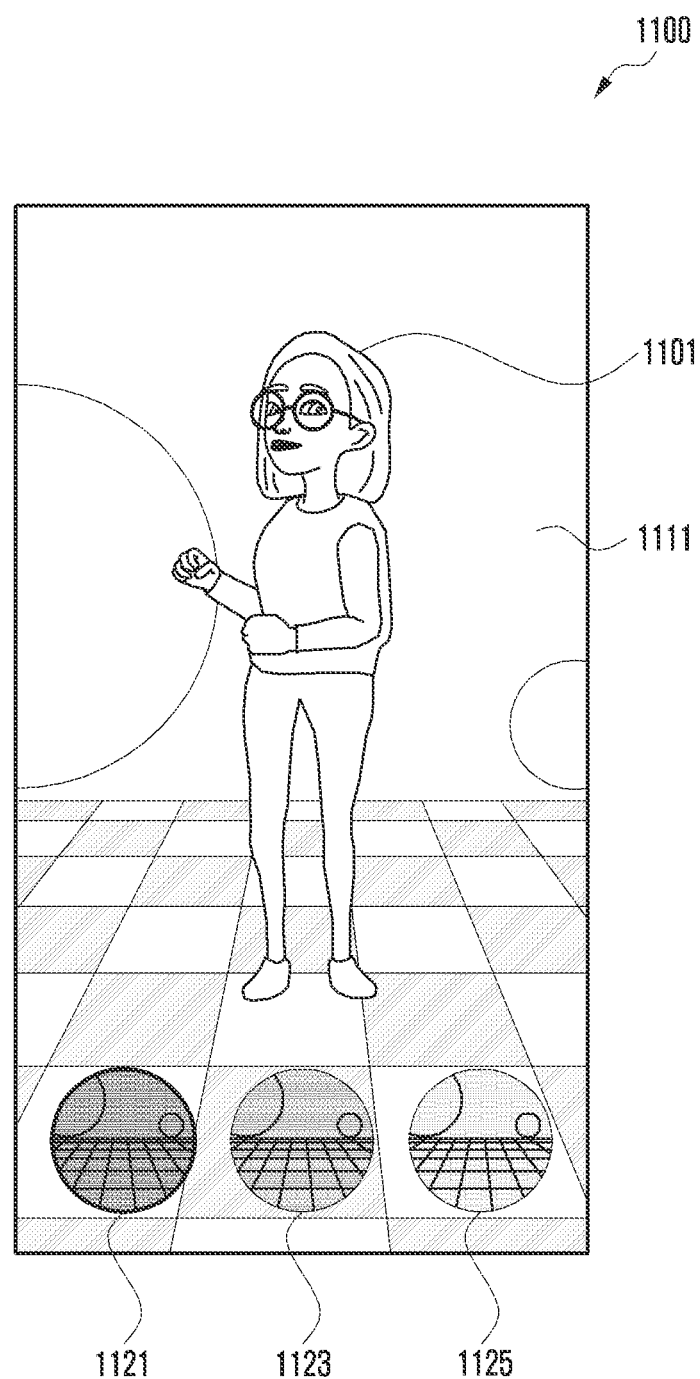
FIG. 11 is a diagram for describing a method of setting a background image of an emoji according to an embodiment of the disclosure.

FIG. 11 is a diagram 1100 for describing a method of setting a background image of an emoji according to an embodiment of the disclosure.

Referring to FIG. 11, when a user input to select a background setting object (e.g., the background setting object 723 in FIG. 7) is detected in the emoji home screen, a processor (e.g., the processor 340 in FIG. 3A) may display, on a display (e.g., the display 337 in FIG. 3A), at least one changeable background image, for example, a first background image 1121, a second background image 1123, and a third background image 1125. In an embodiment, the at least one changeable background may be downloaded from an external electronic device (e.g., the electronic device 102 or 104 or the server 108 in FIG. 1).

In an embodiment, the processor may further display a currently applied background image 1111 and an emoji 1101 (e.g., the emoji 1001 in FIG. 10) disposed in the currently applied background image 1111 along with the at least one changeable background image 1121, 1123 or 1125.

In an embodiment, when a user input to select one of the at least one background image 1121, 1123, or 1125 is detected, the processor may display the selected background image by changing the currently applied background image 1111 into the selected background image. As the selected background image is displayed by changing the currently applied background image 1111 into the selected background image in real time in response to a user input to select a background image, a user can intuitively identify the changed background image.

Figure 12:
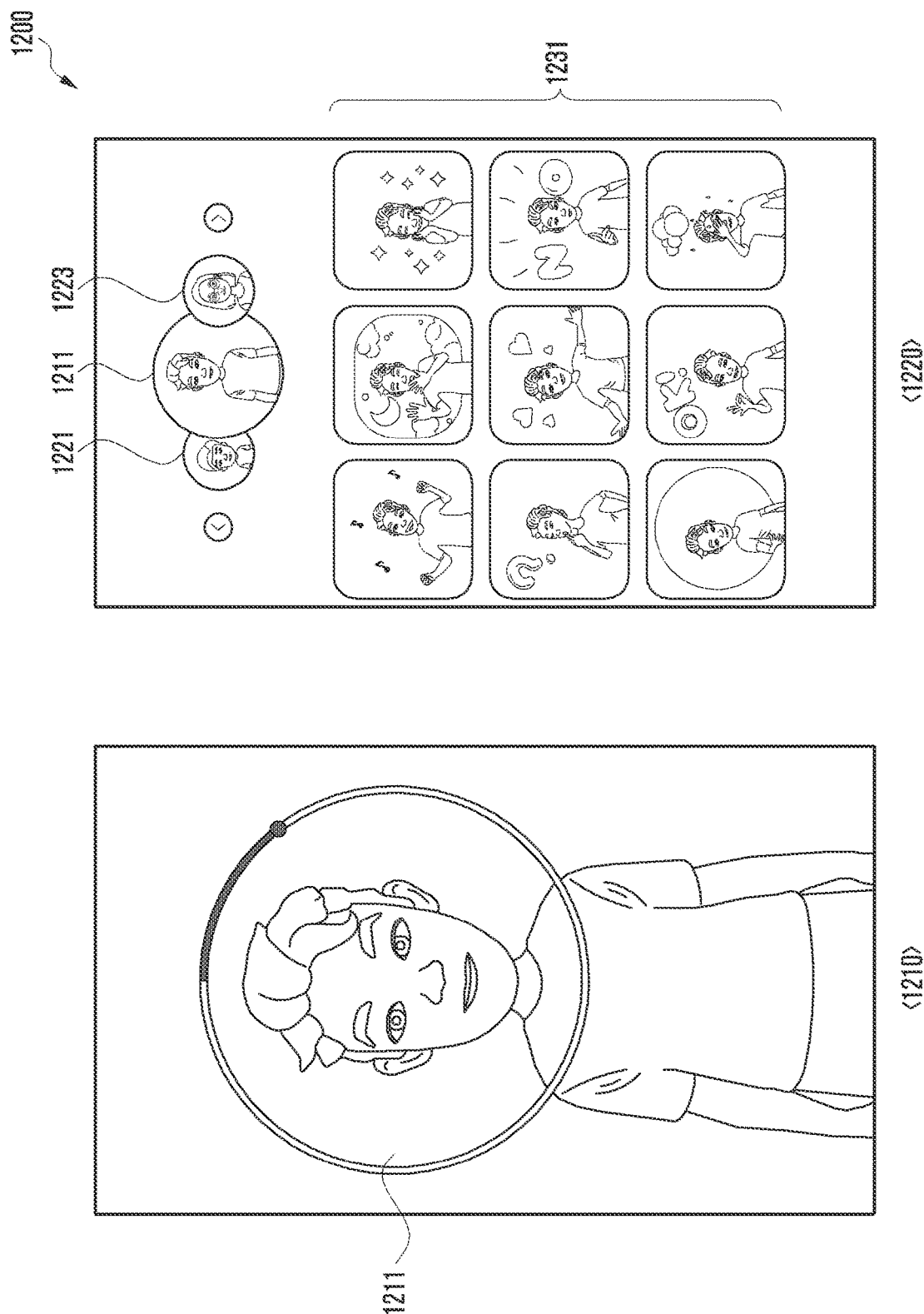
FIG. 12 is a diagram for describing a method of generating a sticker based on an emoji according to an embodiment of the disclosure.

FIG. 12 is a diagram 1200 for describing a method of generating a sticker based on an emoji according to an embodiment of the disclosure.

Referring to FIG. 12, when a user input to select a sticker generation object (e.g., the sticker generation object 725 in FIG. 7) provided in an emoji home screen (e.g., the image home screen in FIG. 7) is detected, the processor may display, on a display (e.g., the display 337 in FIG. 3A), a user interface in which a sticker is generated based on an emoji 1211 (e.g., the emoji 1101 in FIG. 1), as illustrated in reference numeral 1210.

In an embodiment, when the user interface in which a sticker is generated is displayed and a designated time elapses, the processor may display at least one sticker 1231 generated based on the emoji 1211 as illustrated in reference numeral 1220. For example, the processor may detect a facial element and the outline of the face in the emoji 1211. The facial element may include an eye, a nose, and a mouth, an ear and/or a special element (e.g., a beard or classes). The outline of the face may include a face line and a head line. The processor may change, in an emoji form corresponding to each pose, a facial element and the outline of a face detected based on a pose set having a defined sticker format by applying the facial element and the outline of the face to a model suitable for each pose, and may generate the at least one sticker 1231 into which the changed emoji form has been inserted. The pose set having a sticker format may include at least one emotion pose (e.g., happiness, depression, or irritation) (or an operation pose (e.g., Hello, OK, High five), text (e.g., text indicative of an emotion or operation)), and may include a model corresponding to each emotion pose (or an operation pose or text). The model may be used to change the facial element and the outline shape into a face shape corresponding to the emotion pose. For example, the model may be used to change the emoji 1211 so that a facial expression, such as a smiling expression, a crying expression or an angry expression, is suitable for a pose having a sticker format.

In an embodiment, the processor may generate at least one sticker based on an emoji, for example, a first emoji 1221 and a second emoji 1223 selected in response to a user input to select at least one emoji previously stored in an emoji database (e.g., the emoji database 365 in FIG. 3B), for example, the first emoji 1221 and the second emoji 1223, in addition to the emoji 1211.

Figure 13:
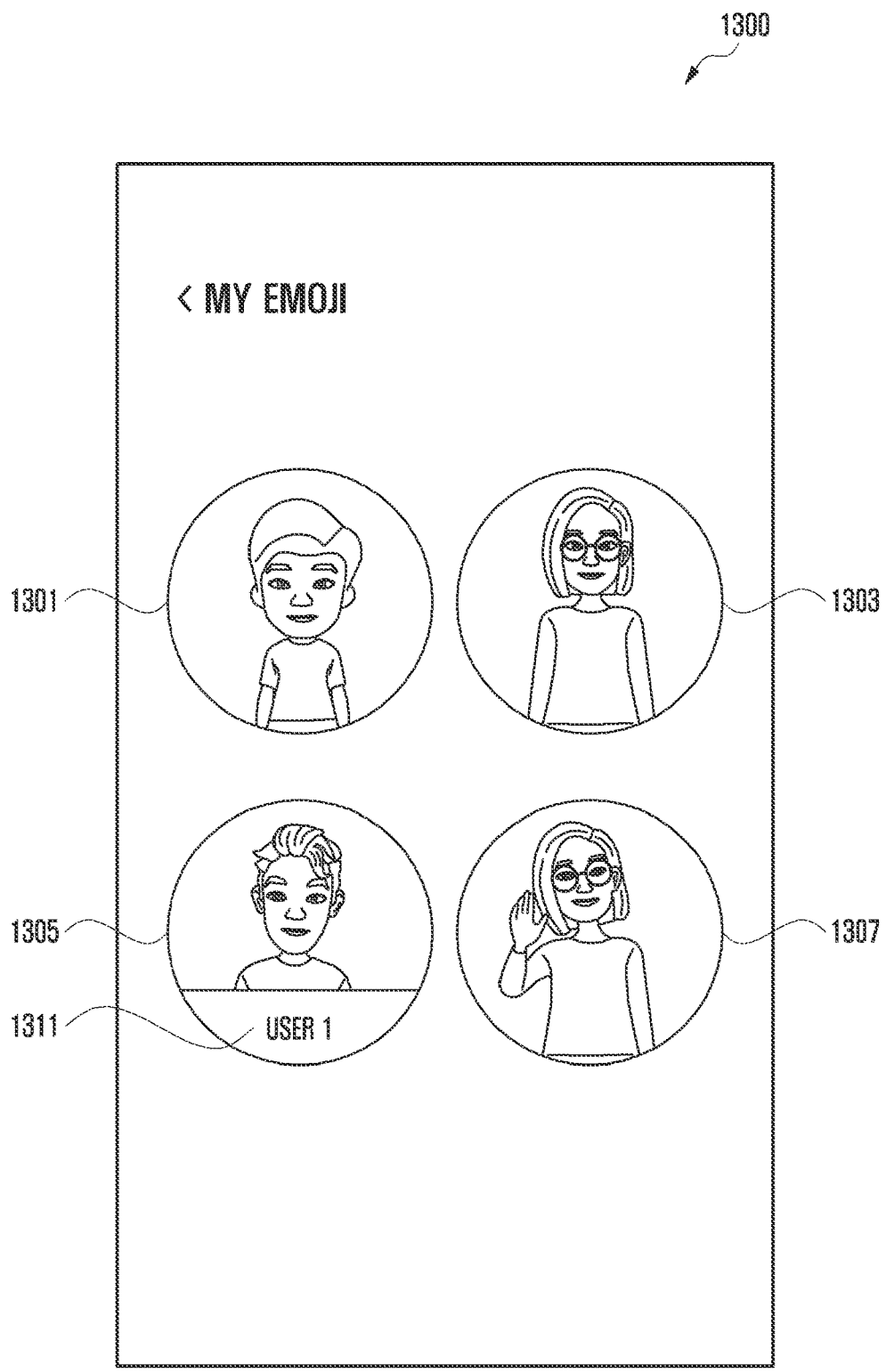
FIG. 13 is a diagram for describing a method of managing at least one generated emoji according to an embodiment of the disclosure.

FIG. 13 is a diagram 1300 for describing a method of managing at least one generated emoji according to an embodiment of the disclosure.

Referring to FIG. 13, a processor (e.g., the processor 340 in FIG. 3A) may generate at least one emoji of a subject according to FIG. 5. The generated at least one emoji may be stored in an emoji database (e.g., the emoji database 365 in FIG. 3B).

In an embodiment, when a user input to select an emoji display object (not illustrated) for displaying at least one emoji previously stored in an emoji database (e.g., the emoji database 365 in FIG. 3B) in the state in which the emoji home screen in FIG. 7 has been displayed is detected, the processor may provide an emoji list including at least one emoji, for example, a first emoji 1301, a second emoji 1303, a third emoji 1305, and a fourth emoji 1307.

In an embodiment, each of the at least one emoji (e.g., the first emoji 1301, the second emoji 1303, the third emoji 1305, and the fourth emoji 1307) may be managed in the emoji database. For example, the processor may delete or modify any one of emojis included in an emoji list in response to a user input, or may add a new emoji.

In an embodiment, the processor may display, on the emoji home screen, an emoji selected in an emoji list in response to a user input.

In an embodiment, if information (e.g., a name or a nickname indicative of an emoji) has been set for each of at least one emoji, the processor may display the set information in a corresponding emoji. For example, if a name indicative of the third emoji 1305, for example, "user1" has been set for the third emoji 1305, the processor may display a name "user1" 1311 in the third emoji 1305.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wired), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. The term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. An electronic device comprising:
a camera;
a touch screen display;
memory storing instructions; and
a processor;
wherein the instructions, when executed by the processor, cause the electronic device to:
display, on the touch screen display, a preview image comprising an emoji of a user to which a motion of a subject has been applied based on the motion of the subject obtained from the camera, the emoji being an avatar generated based on a feature point of the user extracted from the preview image,
display, on the touch screen display, a user interface comprising the emoji and a plurality of objects capable of performing a plurality of edit functions of the emoji in response to receiving a first touch input, wherein the plurality of edit functions includes a function of animating the emoji, a function of editing the emoji, a function of setting a background image of the emoji, a function of generating a sticker based on the emoji, a function of downloading an item of the emoji, a function of downloading an animation of the emoji, and a function of sharing the emoji,
apply a plurality of animations randomly to the emoji, and display the randomly applied animations of the emoji, the randomly applied animations of the emoji being different animations applied to the emoji at designated time intervals,
apply, in response to receiving a second touch input on a specific area among a plurality of areas of the emoji, a first animation mapped to the specific area to the emoji and display the applied first animation of the emoji,
receive a third touch input on the specific area of the emoji after receiving the second touch input,
apply, in response to receiving the third touch input on the specific area of the emoji, a second animation mapped to the specific area to the emoji and display the applied second animation of the emoji,
apply, in response to receiving a fourth touch input exceeding a designated intensity value on the specific area of the emoji, a third animation having a first movement size among a set of animations mapped to the specific area and display the applied third animation of the emoji, and
apply, in response to receiving a fifth touch input less than or equal to the designated intensity value on the specific area of the emoji, a fourth animation having a second movement size among the set of animations mapped to the specific area and display the applied fourth animation of the emoji, wherein the second movement size is smaller than the first movement size.

2. The electronic device of claim 1, further comprising:
a microphone,
wherein the instructions, when executed by the processor, further cause the electronic device to: receive a user utterance related to at least one of an expression or an operation of the emoji through the microphone.

3. The electronic device of claim 2, wherein the instructions, when executed by the processor, further cause the electronic device to:
apply a fifth animation related to the at least one of the expression or the operation to the emoji based on the user utterance and display the applied fifth animation of the emoji.

4. The electronic device of claim 1, wherein the specific area includes at least one of a head area, a hand area, a belly area, or a leg area of the emoji.

5. The electronic device of claim 1, wherein the instructions, when executed by the processor, further cause the electronic device to:
identify a fifth animation of the emoji related to a designated operation designated to induce the second touch input based on the second touch input not being received for a designated time after displaying the user interface, and
apply the fifth animation to the emoji and display the applied fifth animation of the emoji.

6. The electronic device of claim 1, wherein the instructions, when executed by the processor, further cause the electronic device to:
stop displaying the emoji based on the motion of the subject in response to the first touch input, and
display the randomly applied animations of the emoji.

7. The electronic device of claim 1,
wherein the instructions, when executed by the processor, further cause the electronic device to:
receive a sixth touch input to select an object of the plurality of objects, and
perform an edit function of the emoji corresponding to the selected object in response to the sixth touch input.

8. The electronic device of claim 1, wherein the plurality of animations applied to the emoji include a smiling animation.

9. A method of providing a user interface for editing an emoji while operating a camera function of an electronic device, the method comprising:
displaying, on a touch screen display of the electronic device, a preview image comprising the emoji of a user to which a motion of a subject has been applied based on the motion of the subject obtained from a camera of the electronic device, the emoji being an avatar generated based on a feature point of the user extracted from the preview image;

displaying, on the touch screen display, the user interface comprising the emoji and a plurality of objects capable of performing a plurality of edit functions of the emoji in response to receiving a first touch input, wherein the plurality of edit functions includes a function of animating the emoji, a function of editing the emoji, a function of setting a background image of the emoji, a function of generating a sticker based on the emoji, a function of downloading an item of the emoji, a function of downloading an animation of the emoji, and a function of sharing the emoji;

applying a plurality of animations randomly to the emoji, and displaying the randomly applied animations of the emoji, the randomly applied animations of the emoji being different animations applied to the emoji at designated time intervals;

applying, in response to receiving a second touch input on a specific area among a plurality of areas of the emoji, a first animation mapped to the specific area to the emoji and displaying the applied first animation of the emoji;

receiving a third touch input on the specific area of the emoji after receiving the second touch input;

applying, in response to receiving the third touch input on the specific area of the emoji, a second animation mapped to the specific area to the emoji and displaying the applied second animation of the emoji;

applying, in response to receiving a fourth touch input exceeding a designated intensity value on the specific area of the emoji, a third animation having a first movement size among a set of animations mapped to the specific area and displaying the applied third animation of the emoji; and applying, in response to receiving a fifth touch input less than or equal to the designated intensity value on the specific area of the emoji, a fourth animation having a second movement size among the set of animations mapped to the specific area and displaying the applied fourth animation of the emoji, wherein the second movement size is smaller than the first movement size.

10. An electronic device comprising:
wireless communication circuitry;
a touch screen display;
memory storing instructions; and
a processor; and
wherein the instructions, when executed by the processor, cause the electronic device to:
display, on the touch screen display, a user interface comprising an emoji, the emoji being an avatar generated based on a feature point of a user extracted from a preview image,
display, on the touch screen display, a user interface comprising the emoji and a plurality of objects capable of performing a plurality of edit functions of the emoji in response to receiving a first touch input, wherein the plurality of edit functions includes a function of animating the emoji, a function of editing the emoji, a function of setting a background image of the emoji, a function of generating a sticker based on the emoji, a function of downloading an item of the emoji, a function of downloading an animation of the emoji, and a function of sharing the emoji,
apply a plurality of animations randomly to the emoji, and display the randomly applied animations of the emoji, the randomly applied animations of the emoji being different animations applied to the emoji at designated time intervals,
apply, in response to receiving a second touch input on a specific area among a plurality of areas of the emoji, a first animation mapped to the specific area to the emoji and display the applied first animation of the emoji,
receive a third touch input on the specific area of the emoji after receiving the second touch input,
apply, in response to receiving the third touch input on the specific area of the emoji, a second animation mapped to the specific area to the emoji and display the applied second animation of the emoji,
apply, in response to receiving a fourth touch input exceeding a designated intensity value on the specific area of the emoji, a third animation having a first movement size among a set of animations mapped to the specific area and display the applied third animation of the emoji,
apply, in response to receiving a fifth touch input less than or equal to the designated intensity value on the specific area of the emoji, a fourth animation having a second movement size among the set of animations mapped to the specific area and display the applied fourth animation of the emoji, wherein the second movement size is smaller than the first movement size,
download, from an external electronic device, a fifth animation of the emoji through the wireless communication circuitry based on a sixth touch input for selecting an object corresponding to the function of downloading the animation of the emoji, and
update the applied fourth animation of the emoji with the downloaded fifth animation and displaying the fifth animation of the emoji by the updating.

11. The electronic device of claim 10, wherein the instructions, when executed by the processor, further cause the electronic device to:
display, on the touch screen display, a second user interface comprising at least one animation of the emoji in response to the sixth touch input, and
download, in response to receiving a seventh touch input for selecting the fifth animation of the at least one animation, the selected fifth animation from the external electronic device through the wireless communication circuitry.

12. The electronic device of claim 10,
wherein the instructions, when executed by the processor, further cause the electronic device to:
display, on the touch screen display, a list comprising the set of animations stored in the memory and related to the specific area in response to receiving a seventh touch input, and
apply, in response to receiving a eighth touch input for selecting a sixth animation among the set of animations, the selected sixth animation to the emoji and display the applied sixth animation of the emoji, and
wherein the plurality set of animations comprises at least one animation mapped to the specific area and the at least one animation downloaded from the external electronic device through the wireless communication circuitry.

13. One or more non-transitory computer-readable storage media storing one or more computer programs including computer-executable instructions that, when executed by one or more processors of an electronic device, cause the electronic device to perform operations, the operations comprising:

displaying, on a touch screen display, a preview image comprising an emoji of a user to which a motion of a subject has been applied based on the motion of the subject obtained from a camera, the emoji being an avatar generated based on a feature point of the user extracted from the preview image, displaying, on the touch screen display, a user interface comprising the emoji and a plurality of objects capable of performing a plurality of edit functions of the emoji in response to receiving a first touch input, wherein the plurality of edit functions includes a function of animating the emoji, a function of editing the emoji, a function of setting a background image of the emoji, a function of generating a sticker based on the emoji, a function of downloading an item of the emoji, a function of downloading an animation of the emoji, and a function of sharing the emoji, applying a plurality of animations randomly to the emoji, and display the randomly applied animations of the emoji, the randomly applied animations of the emoji being different animations applied to the emoji at designated time intervals, applying, in response to receiving a second touch input on a specific area among a plurality of areas of the emoji, a first animation mapped to the specific area to the emoji and display the applied first animation of the emoji, receiving a third touch input on the specific area of the emoji after receiving the second touch input, applying, in response to receiving the third touch input on the specific area of the emoji, a second animation mapped to the specific area to the emoji and display the applied second animation of the emoji, applying, in response to receiving a fourth touch input exceeding a designated intensity value on the specific area of the emoji, a third animation having a first movement size among a set of animations mapped to the specific area and display the applied third animation of the emoji, and applying, in response to receiving a fifth touch input less than or equal to the designated intensity value on the specific area of the emoji, a fourth animation having a second movement size among the set of animations mapped to the specific area and display the applied fourth animation of the emoji, wherein the second movement size is smaller than the first movement size.

14. The one or more non-transitory computer-readable storage media of claim 13, wherein the operations further comprising:

receiving a user utterance related to at least one of an expression or an operation of the emoji through a microphone.

\* \* \* \* \*